(12) United States Patent
Isahaya et al.

(10) Patent No.: US 9,428,608 B2
(45) Date of Patent: Aug. 30, 2016

(54) AROMATIC POLYCARBONATE RESIN COMPOSITION

(71) Applicant: MITSUBISHI GAS CHEMICAL COMPANY, INC., Tokyo (JP)

(72) Inventors: Yoshinori Isahaya, Ibaraki (JP); Atsushi Hirashima, Chiba (JP); Hidefumi Harada, Hyogo (JP); Maki Ito, Ibaraki (JP); Jun-ya Hayakawa, Chiba (JP); Takehiko Isobe, Chiba (JP); Taichi Tokutake, Tokyo (JP); Yousuke Shinkai, Chiba (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/442,892

(22) PCT Filed: Nov. 15, 2013

(86) PCT No.: PCT/JP2013/080845
§ 371 (c)(1),
(2) Date: May 14, 2015

(87) PCT Pub. No.: WO2014/077341
PCT Pub. Date: May 22, 2014

(65) Prior Publication Data
US 2015/0284509 A1    Oct. 8, 2015

(30) Foreign Application Priority Data
Nov. 17, 2012  (JP) ................................. 2012-252795

(51) Int. Cl.
| C08G 64/00 | (2006.01) |
| C08G 64/06 | (2006.01) |
| C08G 64/42 | (2006.01) |
| C08G 64/30 | (2006.01) |
| C08G 64/40 | (2006.01) |
| C08G 63/02 | (2006.01) |

(52) U.S. Cl.
CPC .............. C08G 64/06 (2013.01); C08G 64/307 (2013.01); C08G 64/406 (2013.01); C08G 64/42 (2013.01)

(58) Field of Classification Search
CPC ............................. C08G 64/14; C08G 64/307
USPC ............... 528/196, 198; 264/176.1, 219
See application file for complete search history.

(56) References Cited

U.S. PATENT DOCUMENTS

| 3,535,280 A | 10/1970 | Schnell et al. |
| 5,521,275 A | 5/1996 | McCloskey et al. |
| 5,696,222 A | 12/1997 | Kaneko et al. |
| 5,932,683 A | 8/1999 | Hachiya et al. |
| 6,300,459 B1 | 10/2001 | Kaneko et al. |
| 6,770,731 B2 | 8/2004 | Mason et al. |
| 7,115,700 B2 * | 10/2006 | Cella ...................... C08G 63/64 264/176.1 |
| 7,132,498 B2 | 11/2006 | McCloskey et al. |
| 8,158,745 B2 * | 4/2012 | Wehrmann ........... C08G 64/307 528/167 |
| 8,674,053 B2 | 3/2014 | Isahaya et al. |
| 8,969,505 B2 | 3/2015 | Isahaya et al. |
| 2013/0197166 A1 | 8/2013 | Isahaya et al. |
| 2014/0206826 A1 * | 7/2014 | Isahaya .............. C08G 64/1608 525/462 |
| 2014/0371404 A1 * | 12/2014 | Isahaya ................ B01J 19/0066 525/462 |
| 2015/0267006 A1 * | 9/2015 | Isahaya .................. C08G 64/06 525/54 |
| 2015/0274887 A1 * | 10/2015 | Isahaya .................. C08G 64/04 525/462 |

FOREIGN PATENT DOCUMENTS

| EP | 0 595 608 | 5/1994 |
| EP | 1 363 962 | 11/2003 |
| JP | 50-19600 | 7/1975 |
| JP | 2-153923 | 6/1990 |
| JP | 6-94501 | 11/1994 |
| JP | 3249825 | 11/2001 |
| JP | 3271353 | 1/2002 |
| JP | 3301453 | 4/2002 |
| JP | 2003-119369 | 4/2003 |
| JP | 2004-2831 | 1/2004 |
| JP | 2004-109162 | 4/2004 |
| JP | 2004-168911 | 6/2004 |
| JP | 4112979 | 4/2008 |
| JP | 4113781 | 4/2008 |
| JP | 2008-514754 | 5/2008 |
| JP | 4286914 | 4/2009 |
| JP | 2009-102536 | 5/2009 |
| JP | 4318346 | 6/2009 |
| WO | 2009/127366 | 10/2009 |
| WO | 2011/062220 | 5/2011 |
| WO | 2011/120921 | 10/2011 |
| WO | 2012/108510 | 8/2012 |
| WO | 2012/157766 | 11/2012 |

OTHER PUBLICATIONS

International Search Report issued Feb. 18, 2014 in PCT/JP2013/080845.

* cited by examiner

*Primary Examiner* — Terressa Boykin

(74) *Attorney, Agent, or Firm* — Greenblum & Bernstein, P.L.C.

(57) ABSTRACT

The present invention provides an aromatic polycarbonate resin composition having a high molecular weight and less amount of a heterologous structure, retaining good qualities, and excellent in thermal stability, and an improved preparation process thereof.

11 Claims, No Drawings

AROMATIC POLYCARBONATE RESIN COMPOSITION

TECHNICAL FIELD

The present invention relates to an aromatic polycarbonate resin composition and a preparation process thereof. More specifically, the present invention relates to an aromatic polycarbonate resin composition having a high molecular weight and less amount of a heterologous structure, retaining good qualities, and excellent in thermal stability, and an improved preparation process thereof.

BACKGROUND ART

A polycarbonate is excellent in heat resistance, impact resistance and transparency, so that, in recent years, it has been widely used in many fields.

In the preparation process of the polycarbonate, many investigations have heretofore been done. Among these, a polycarbonate derived from an aromatic dihydroxy compound, for example, 2,2-bis(4-hydroxyphenyl)propane (hereinbelow, referred to as "bisphenol A") has been industrially produced by any preparation processes of the interfacial polymerization method or the melt polymerization method.

According to the interfacial polymerization method, the polycarbonate is produced from bisphenol A and phosgene, but poisonous phosgene must be used. Also, there remain the problems that the apparatus is corroded by a chlorine-containing compound such as by-produced hydrogen chloride or sodium chloride, and methylene chloride used as the solvent with a large amount, etc., removal of the impurities such as sodium chloride, and remaining methylene chloride, which cause effects on the polymer physical property is difficult, and a large amount of wastewater is generated so that treatment of the wastewater becomes the problem.

On the other hand, as a process for preparing a polycarbonate from an aromatic dihydroxy compound and a diarylcarbonate, for example, it has been known a melt polymerization method from long ago in which bisphenol A and diphenylcarbonate are polymerized in a melt state by transesterification, while removing the by-produced aromatic monohydroxy compound. The melt polymerization method has merits that it does not use a solvent, etc., different from the interfacial polymerization method, but it has an essential problem that a polymer viscosity in the system abruptly increases as the polymerization proceeds and it becomes difficult to remove the by-produced aromatic monohydroxy compound out of the system with good efficiency, whereby the reaction rate is extremely lowered and the polymerization degree is difficultly increased.

To solve the problem, various devices have been investigated for extracting the aromatic monohydroxy compound from the polymer with a high viscosity state. For example, Patent Document 1 (JP Sho. 50-19600B) discloses a screw type polymerization apparatus having a vent portion. Further, Patent Document 2 (JP H2-153923A) discloses a method which uses a thin film evaporation device and a horizontal type polymerization device in combination.

Also, Patent Document 3 (U.S. Pat. No. 5,521,275B) discloses a method in which conversion of a molecular weight of an aromatic polycarbonate is carried out in the presence of a catalyst, by using an extruder having a polymer sealing portion and a vent portion under reduced pressure conditions.

However, according to the methods disclosed in these publications, the molecular weight of the polycarbonate cannot sufficiently be increased. When higher polymerization is carried out by the above-mentioned method using a large amount of a catalyst or under severe conditions in which high shearing is given, whereby bad effects are exerted to the resin such as deterioration of hue of the resin or progress of the cross-linking reaction.

Further, it has been known that a polymerization degree of the polycarbonate can be heightened in the melt polymerization method by adding a polymerization promoter to the reaction system. When the molecular weight can be increased with a short reaction detention time and at a low reaction temperature, production quantity of the polycarbonate can be heightened, and consequently a design of a reactor which is simple and inexpensive can be easily carried out.

Patent Document 4 (EP 0595608 B1) discloses a method of reacting some diarylcarbonates at the time of molecular weight conversion, but significant increase in the molecular weight cannot be accomplished. Also, Patent Document 5 (U.S. Pat. No. 5,696,222B) discloses a method for producing a polycarbonate having a higher polymerization degree by addition of a certain kind of a polymerization promoter, for example, an aryl ester compound of a carbonic acid and dicarboxylic acid including bis(2-methoxyphenyl)carbonate, bis(2-ethoxyphenyl)carbonate, bis(2-chlorophenyl)carbonate, bis(2-methoxyphenyl)terephthalate and bis(2-methoxyphenyl)adipate. The above-mentioned Patent Document 5 teaches that, when an ester compound is used as the polymerization promoter, an ester bond is introduced, and as a result, a polyester carbonate copolymer is formed (in place of a homopolymer), so that hydrolysis stability is low.

Patent Document 6 (JP Patent No. 4112979) discloses a method of reacting some bissalicyl carbonates for increasing the molecular weight of an aromatic polycarbonate.

Patent Document 7 (JP 2008-514754A) discloses a method of highly polymerizing by introducing a polycarbonate oligomer and bissalicyl carbonate, etc., into an extruder.

Patent Document 8 (JP Patent No. 4286914) discloses a method in which a terminal hydroxyl group amount is increased by an active hydrogen compound (dihydroxy compound), and then, coupling of the aromatic polycarbonate having the increased terminal hydroxyl group amount is carried out with a salicylic acid ester derivative.

However, the method disclosed in the above-mentioned publication in which the terminal hydroxyl group of the polycarbonate is required to be increased, requires a reaction step with an active hydrogen compound and a reaction step with a salicylic acid ester derivative so that the steps are complicated, and a polycarbonate having many terminal hydroxyl groups has low thermal stability, so that it has a risk of lowering in physical property. Also, increase in an amount of the hydroxyl group by the active hydrogen compound leads a partial chain dividing reaction, which is accompanied by enlargement of a molecular weight distribution. Further, to obtain a sufficient reaction rate, it is necessary to use a catalyst with a relatively large amount, so that it can be considered the possibility that lowering in physical property at the time of molding is caused.

Some proposals have been made about a process for producing a polycarbonate by adding a diol compound to the reaction system. For example, Patent Document 9 (JP H6-94501B) discloses a preparation process of a high molecular weight polycarbonate by introducing 1,4-cyclohexanediol. However, according to the process disclosed therein, 1,4-cyclohexanediol is added with an aromatic dihydroxy compound from the start of the polycondensation reaction system, 1,4-cyclohexanediol is firstly consumed for the polycarbonating reaction (oligomerization), and thereafter, the aromatic dihydroxy compound is reacted to be highly polymerized. Thus, there are defects that the reaction time becomes relatively long, and physical properties of external appearance such as hue is likely lowered.

Patent Document 10 (JP 2009-102536A) discloses a preparation process of a polycarbonate in which a specific aliphatic diol and an ether diol are copolymerized. However, the polycarbonate disclosed therein has an isosorbide skeleton as a main structure, so that excellent impact resistance required for the aromatic polycarbonate cannot be shown.

Further, there have been proposed a method in which a cyclic carbonate compound is added to a reaction system (Patent Document 11; JP Patent No. 3271353), a method in which a diol having a hydroxyl group basicity of which is higher than that of the dihydroxy compound used is added to a reaction system (Patent Document 12; JP Patent No. 3301453), etc., but in either of the methods, a high molecular weight polycarbonate resin having physical properties sufficiently satisfied cannot be obtained.

Thus, the conventional preparation processes of a high molecular weight aromatic polycarbonate involve many problems, and demands for obtaining an improved preparation process which can retain good qualities of the inherent polycarbonate, and can accomplish sufficiently higher polymerization, still exists.

The present inventors have previously found out a novel process, as a process for obtaining an aromatic polycarbonate which can accomplish a rapid polymerization rate and gives good quality, in which end-capped terminals of the aromatic polycarbonate is connected with an aliphatic diol compound to elongate the chain (Patent Document 13; WO 2011/062220A pamphlet). According to this process, a end-capped terminal of the aromatic polycarbonate is linked to the aliphatic diol compound to elongate the chain, whereby an aromatic polycarbonate resin with a high polymerization degree having an Mw of about 30,000 to 100,000 can be produced within a short period of time. This process produces a polycarbonate with a high speed polymerization reaction, so that branching or cross-linking reaction caused by thermal detention for a long period of time, etc., can be restrained, and deterioration of the resin such as hue, etc., can be avoided.

The present inventors have also previously proposed a preparation process of a branched aromatic polycarbonate resin having a desired branching degree which includes a step of subjecting an aromatic polycarbonate prepolymer into which a branched structure has been introduced and an aliphatic diol compound to transesterification reaction under reduced pressure conditions in the presence of a transesterification catalyst (Patent Document 14; WO 2012/108510A pamphlet).

According to the process for making the highly polymerized polycarbonate by using a linking agent comprising these aliphatic diol compounds, a polycarbonate resin which retains good qualities of the inherent polycarbonate, and accomplishes sufficiently higher polymerization can be produced easily and rapidly, but development of a high molecular weight polycarbonate resin having better thermal stability has been desired.

As one of the factors which impair the thermal stability, a heterologous structure existing in the polycarbonate resin can be mentioned. In the polycarbonate resin obtained by using the melt polymerization method, it has already been known the problem that not a little heterologous structure is present in the main chain, but it is not easy to produce a polycarbonate resin with a little ratio of the heterologous structure by the melt polymerization method. And many contrivances to improve melt characteristics or moldability have been proposed by grasping the existence of the heterologous structure rather positively (Patent Documents 15 to 23).

It is important for the development of a high molecular weight polycarbonate resin with good thermal stability by using the melt polymerization method to produce a polycarbonate resin which has a high molecular weight but a ratio of the heterologous structure is extremely little, but a sufficiently satisfied method has not been proposed.

PRIOR ART DOCUMENTS

Patent Documents

[Patent Document 1] JP Sho50-19600B
[Patent Document 2] JP H2-153923A
[Patent Document 3] U.S. Pat. No. 5,521,275B
[Patent Document 4] EP 0595608B1
[Patent Document 5] U.S. Pat. No. 5,696,222B
[Patent Document 6] JP Patent No. 4112979
[Patent Document 7] JP 2008-514754A
[Patent Document 8] JP Patent No. 4286914
[Patent Document 9] JP H6-94501B
[Patent Document 10] JP2009-102536A
[Patent Document 11] JP Patent No. 3271353
[Patent Document 12] JP Patent No. 3301453
[Patent Document 13] WO 2011/062220A pamphlet
[Patent Document 14] WO 2012/108510A pamphlet
[Patent Document 15] JP 2004-109162A
[Patent Document 16] JP Patent No. 4318346
[Patent Document 17] JP Patent No. 3249825
[Patent Document 18] JP 2003-119369A
[Patent Document 19] JP 2004-2831A
[Patent Document 20] JP 2004-168911A
[Patent Document 21] JP Patent No. 4113781
[Patent Document 22] WO 2009/127366A pamphlet
[Patent Document 23] WO 2011/120921A pamphlet

DISCLOSURE OF THE INVENTION

Problems to be Solved by the Invention

The tasks to be solved by the present invention are to provide an aromatic polycarbonate resin composition having a high molecular weight and containing less heterologous structure, retaining good quality, and yet excellent in thermal stability, and an improved preparation process thereof.

Means to Solve the Problems

The present inventors have intensively studied to solve the above-mentioned tasks, and as a result, they have found a resin composition containing an aromatic polycarbonate resin which has merits of qualities such as a higher molecular weight as well as a low branching degree, and a little heterologous structure, in particular, in which a content of a specific heterologous structure is a certain amount or less and thermal stability (heat resistance) under high temperatures is markedly improved, and a preparation process thereof, whereby accomplished the present invention.

That is, the present invention provides a highly polymerized aromatic polycarbonate resin composition and an improved preparation process thereof shown below.

1) An aromatic polycarbonate resin composition which comprises a structural unit represented by the following formula (II), and at least one of structural units represented by the following formulae (1) and (2), wherein either of the structural units represented by the formulae (1) and (2) is contained in an amount of 2000 ppm or less in terms of a diphenolic acid, and a cyclic carbonate represented by the following formula (h2) is contained in an amount of 3000 ppm or less:

Formula (II)

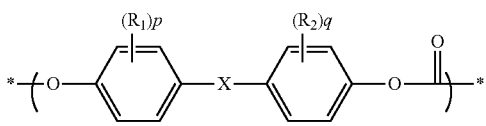

wherein $R_1$ and $R_2$ each independently represent a halogen atom, an alkyl group having 1 to 20 carbon atoms, an alkoxy group having 1 to 20 carbon atoms, a cycloalkyl group having 6 to 20 carbon atoms, an aryl group having 6 to 20 carbon atoms, a cycloalkoxy group having 6 to 20 carbon atoms or an aryloxy group having 6 to 20 carbon atoms, p and q each represent an integer of 0 to 4, X represents a single bond or a group selected from the group of the following (II');

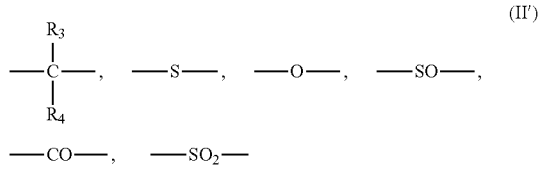

wherein, $R_3$ and $R_4$ each independently represent a hydrogen atom, an alkyl group having 1 to 10 carbon atoms or an aryl group having 6 to 10 carbon atoms, or $R_3$ and $R_4$ may be bonded to each other to form an aliphatic ring;

Formula (1):

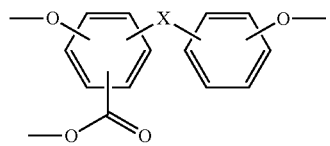

Formula (2):

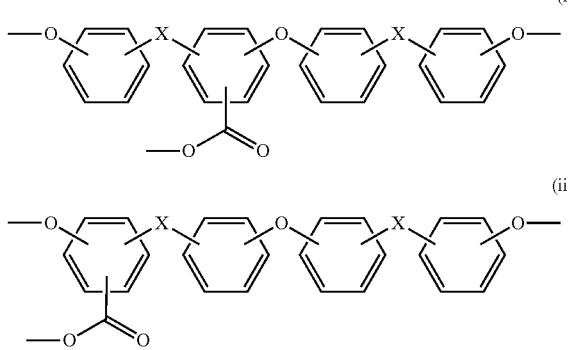

wherein X is the same as defined in the formula (II);

Formula (h2):

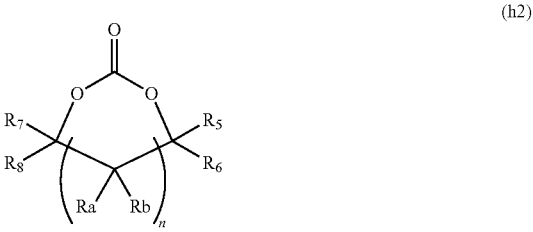

wherein Ra and Rb each independently represent a hydrogen atom, a halogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring, $R_5$ to $R_8$ each independently represent a hydrogen atom, a halogen atom or a linear or branched alkyl group having 1 to 5 carbon atoms, and n represents an integer of 0 to 30.

2) The aromatic polycarbonate resin composition described in 1), wherein the structural unit represented by the above-mentioned formula (1) is contained in an amount of 2000 ppm or less in terms of a diphenolic acid.

3) The aromatic polycarbonate resin composition described in 1), wherein the structural units represented by the above-mentioned formulae (1) and (2) are each contained in an amount of 2000 ppm or less in terms of a diphenolic acid.

4) The aromatic polycarbonate resin composition described in 1), wherein the structural units represented by the above-mentioned formulae (1) and (2) are contained in total in an amount of 5000 ppm or less in terms of a diphenolic acid.

5) The aromatic polycarbonate resin composition described in 1), wherein a structural unit represented by the following formula (3) is further contained in an amount of 150 ppm or less in terms of a diphenolic acid:

Formula (3):

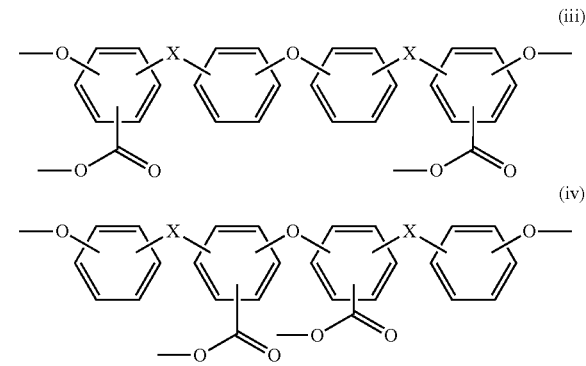

(v)

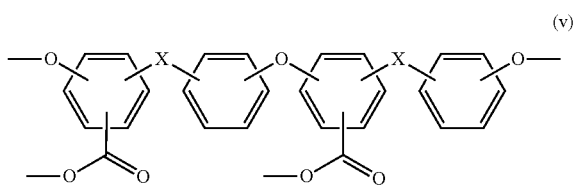

wherein X is the same as defined in the formula (II).

6) The aromatic polycarbonate resin composition described in 1), wherein the cyclic carbonate represented by the formula (h2) is a compound represented by the following formula (h3):

Formula (h3):

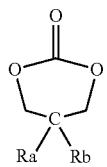
(h3)

wherein Ra and Rb each independently represent a hydrogen atom, a halogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring.

7) The aromatic polycarbonate resin composition described in 1), which has a weight average molecular weight (Mw) of 30,000 to 100,000.

8) The aromatic polycarbonate resin composition described in 1), wherein an N value (a structural viscosity index) represented by the following numerical formula (1) is 1.25 or less:

$$N \text{ value} = (\log(Q160 \text{ value}) - \log(Q10 \text{ value}))/(\log 160 - \log 10) \quad (1)$$

9) The aromatic polycarbonate resin composition as set forth in 1), wherein a molecular weight (Mw) retaining ratio after a heat detention test (at 360° C. for 60 minutes) is 50% or more.

10) A process for preparing an aromatic polycarbonate resin composition described in 1), which comprises a highly polymerizing step of reacting an aromatic polycarbonate prepolymer and an aliphatic diol compound represented by the following formula (g2) in the presence of a transesterification catalyst to obtain a highly polymerized aromatic polycarbonate resin, and a cyclic carbonate-removing step of removing at least part of the cyclic carbonate by-produced in the highly polymerizing step out of the reaction system:

Formula (g2):

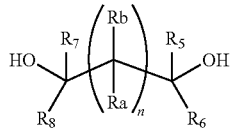
(g2)

wherein Ra and Rb each independently represent a hydrogen atom, a halogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring, $R_5$ to $R_8$ each independently represent a hydrogen atom, a halogen atom or a linear or branched alkyl group having 1 to 5 carbon atoms; and n represents an integer of 0 to 30.

11) The preparation process described in 10), wherein the aliphatic diol compound represented by the formula (g2) is a compound represented by the following formula (g3):

Formula (g3):

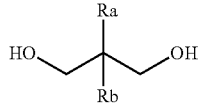
(g3)

wherein Ra and Rb each independently represent a hydrogen atom, a halogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring.

12) The preparation process described in 11), wherein the aliphatic diol compound is selected from the group consisting of 2-butyl-2-ethylpropane-1,3-diol, 2,2-diisobutylpropane-1,3-diol, 2-ethyl-2-methylpropane-1,3-diol, 2,2-diethylpropane-1,3-diol, and 2-methyl-2-propylpropane-1,3-diol.

Effects of the Invention

The aromatic polycarbonate resin composition of the present invention is markedly improved in thermal stability (heat resistance) at high temperatures. Such a resin composition can be obtained by the process which comprises a step of reacting the aromatic polycarbonate (prepolymer) and a linking agent comprising an aliphatic diol compound having a specific structure to obtain a highly polymerized aromatic polycarbonate resin, while removing at least part of a by-produced cyclic carbonate to the outside of the reaction system. In the highly polymerized aromatic polycarbonate resin in the resin composition obtained by such a method, the linking portion does not substantially remain in the chain, and it is substantially the same polycarbonate in the structure as those obtained by the conventional interfacial method or melting method.

Accordingly, such an aromatic polycarbonate resin has equivalent physical properties to those of the polycarbonate obtained by the conventional interfacial method, and such an aromatic polycarbonate resin does not contain a skeleton derived from the linking agent comprising the aliphatic diol compound so that it is excellent in thermal stability (heat resistance). Further, such an aromatic polycarbonate resin is a material highly polymerized with a high speed by using an aliphatic diol compound as a linking agent, so that it has merits in quality that it has a high molecular weight with a low branching degree, and a less content of the heterologous structure. In particular, a content of the specific heterologous structure is a predetermined amount or less, whereby thermal stability (heat resistance) at high temperatures is markedly improved.

Also, the aromatic polycarbonate resin composition of the present invention contains, in a highly polymerized aromatic polycarbonate resin in which a content of a specific heterologous structure is a predetermined amount or less, a material which is a part of a by-produced cyclic carbonate and remaining in the reaction system. By containing such a cyclic carbonate, fluidity of the polycarbonate resin composition may be improved.

EMBODIMENTS TO CARRY OUT THE INVENTION

1. Aromatic Polycarbonate Resin Composition (1) Aromatic Polycarbonate Resin

The aromatic polycarbonate resin composition of the present invention contains an aromatic polycarbonate resin having a structural unit represented by the following formula (II) as a main structural unit.

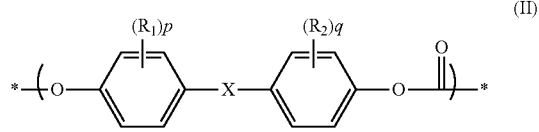

In the formula (II), $R_1$ and $R_2$ each independently represent a halogen atom, an alkyl group having 1 to 20 carbon atoms, an alkoxy group having 1 to 20 carbon atoms, a cycloalkyl group having 6 to 20 carbon atoms, an aryl group having 6 to 20 carbon atoms, a cycloalkoxy group having 6 to 20 carbon atoms or an aryloxy group having 6 to 20 carbon atoms; p and q each represent an integer of 0 to 4; and X represents a single bond or a group selected from the group of the following (II').

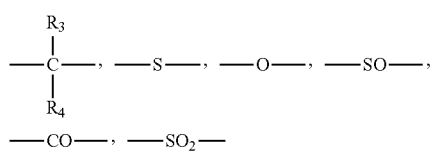

In the formula (II'), $R_3$ and $R_4$ each independently represent a hydrogen atom, an alkyl group having 1 to 10 carbon atoms or an aryl group having 6 to 10 carbon atoms, or $R_3$ and $R_4$ may be bonded to each other to form an aliphatic ring.

As the aromatic dihydroxy compound which induces the structural unit represented by the formula (II), there may be mentioned the compound represented by the following formula (II").

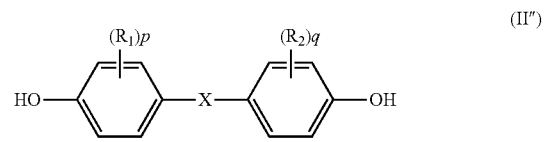

In the formula (II"), $R_1$ to $R_2$, p, q, and X are each the same as those mentioned in the above-mentioned formula (II).

Specific examples of such an aromatic dihydroxy compound may include
bis(4-hydroxyphenyl)methane, 1,1-bis(4-hydroxyphenyl)ethane,
2,2-bis(4-hydroxyphenyl)propane, 2,2-bis(4-hydroxyphenyl)butane,
2,2-bis(4-hydroxyphenyl)octane, bis(4-hydroxyphenyl)phenylmethane,
1,1-bis(4-hydroxyphenyl)-1-phenylethane, bis(4-hydroxyphenyl)diphenylmethane,
2,2-bis(4-hydroxy-3-methylphenyl)propane,
1,1-bis(4-hydroxy-3-tert-butylphenyl)propane,
2,2-bis(3,5-dimethyl-4-hydroxyphenyl)propane,
2,2-bis(4-hydroxy-3-phenylphenyl)propane,
2,2-bis(3-cyclohexyl-4-hydroxyphenyl)propane,
2,2-bis(4-hydroxy-3-bromophenyl)propane,
2,2-bis(3,5-dibromo-4-hydroxyphenyl)propane, 1,1-bis(4-hydroxyphenyl)cyclopentane,
1,1-bis(4-hydroxyphenyl)cyclohexane, 2,2-bis(4-hydroxy-3-methoxyphenyl)propane,
4,4'-dihydroxydiphenylether, 4,4'-dihydroxy-3,3'-dimethyldiphenylether,
4,4'-dihydroxydiphenylsulfide, 4,4'-dihydroxy-3,3'-dimethyldiphenylsulfide,
4,4'-dihydroxydiphenylsulfoxide, 4,4'-dihydroxy-3,3'-dimethyldiphenylsulfoxide,
4,4'-dihydroxydiphenylsulfone, 4,4'-dihydroxydiphenylsulfone,
4,4'-dihydroxy-3,3'-dimethyldiphenylsulfone, etc.

Among these, 2,2-bis(4-hydroxyphenyl)propane is mentioned as the preferred one in the points of stability as a monomer, and further of easy availability of a material containing less impurity, etc.

In the present invention, for the purposes of control of the glass transition temperature, improvement in fluidity, control of optical properties such as improvement in a refractive index and reduction in double refraction, a plural kinds of the above-mentioned various monomers (aromatic dihydroxy compounds) may be used in combination.

In the structural unit constituting the aromatic polycarbonate resin of the present invention, at least one of the structural units represented by the following formulae (1) and (2) (hereinbelow, referred to as "Structural unit (1)" and "Structural unit (2)") is contained as a heterologous structure. Incidentally, X in the following formulae (1) and (2) is the same as that in the formula (II).

Structural Unit (1):

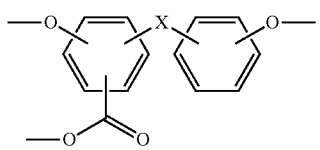

Structural Unit (2):

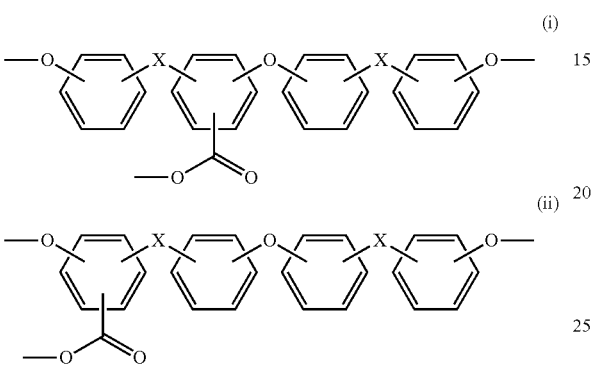

Incidentally, the two structural formulae (i) and (ii) in the structural formula (2) are isomers to each other, and cannot be analytically differentiated so that in the present invention, these are treated as the same structure. Accordingly, the structural formula (2) referred to in the present invention means either or both of the structural formulae (i) and (ii). Also, a content of Structural unit (2) in the present invention means the total amount of the two structural formulae (i) and (ii).

In the present invention, a contained ratio of the structural unit of either of the Structural unit (1) or (2) is 2000 ppm or less in terms of a diphenolic acid, preferably 1500 ppm, further preferably 1000 ppm or less, particularly preferably 500 ppm or less, most preferably 300 ppm or less based on the amount (mass) of the aromatic polycarbonate resin composition. If the content of Structural units (1) and (2) each exceeds 2000 ppm, a branching degree is increased and thermal stability tends to be lowered. Also, these structural units are spontaneously generating branch so that there are demerits that it becomes difficult to control the branching degree simply and easily by the amount of the branching agent to be added, or that fluidity is lowered to cause poor moldability.

As mentioned above, in the present invention, either of Structural units (1) and (2) may be contained in an amount of 2000 ppm, and as a preferred embodiment, at least Structural unit (1) is desirably contained in an amount of 2000 ppm or less, more preferably 1500 ppm or less, further preferably 1000 ppm or less, particularly preferably 500 ppm or less, most preferably 300 ppm or less.

Next desired is that both of Structural units (1) and (2) are contained each in an amount of 2000 ppm or less in terms of a diphenolic acid, more preferably 1500 ppm or less, further preferably 1000 ppm or less, particularly preferably 500 ppm or less, most preferably 300 ppm or less.

Also, a ratio of the structural unit represented by the Structural units (1) and (2) is desirably contained in total in an amount of 5000 ppm or less in terms of a diphenolic acid, more preferably 3000 ppm or less, further preferably 2000 ppm or less, particularly preferably 1000 ppm or less, most preferably 600 ppm or less.

Moreover, in the structural unit constituting the aromatic polycarbonate resin of the present invention, in addition to the Structural units (1) and (2), a structural unit (hereinbelow, referred to as "Structural unit (3)") represented by the following formula (3) is further contained, and a contained ratio thereof is desirably 150 ppm or less in terms of a diphenolic acid, more preferably 100 ppm or less, further preferably 70 ppm or less. Incidentally, X in the following formula (3) is the same as that of the formula (II).

Structural Unit (3):

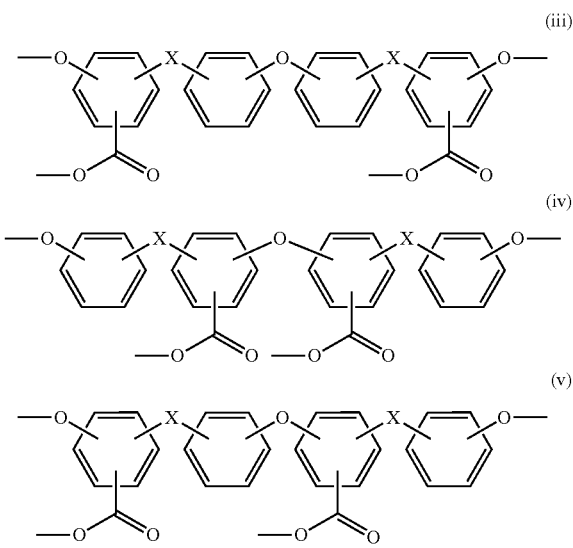

Incidentally, three structural formulae (iii), (iv) and (v) in the structural formula (3) are isomers to each other, and cannot be analytically differentiated so that in the present invention, these are treated as the same structure. Accordingly, the structural formula (3) referred to in the present invention means at least one of the above-mentioned structural formulae (iii), (iv) and (v). Also, a content of Structural unit (3) in the present invention means the total amount of the three structural formulae (iii), (iv) and (v).

The Structural units (1) to (3) are each a kind of the heterologous structures likely formed at the time of producing the aromatic polycarbonate resin, and the aromatic polycarbonate resin of the present invention is characterized in that a ratio of such heterologous structures is a little. The reason is considered that it is prepared by the method containing a step of highly polymerizing an aromatic polycarbonate prepolymer by using a linking agent comprising an aliphatic diol compound having a specific structure mentioned below, and a step of removing at least part of a by-produced cyclic carbonate out of the reaction system.

That is, in spite of linking and highly polymerizing the aromatic polycarbonate resin of the present invention by using an aliphatic diol compound as mentioned above, a structural unit derived from the aliphatic diol compound which is a linking agent is not contained in the skeletal structure of the aromatic polycarbonate resin, or even if it is contained, its content is an extremely little. Thus, the resulting resin has extremely high thermal stability and excellent heat resistance, and provides excellent qualities such as a low N value, less ratio of the unit having a heterologous structure, and excellent in color tone, etc., while it has the same skeletal structure as that of the conventional homopolycarbonate resin.

Here, the unit having a heterologous structure refers to a unit having a structure which has a possibility of causing unfavorable action and effect, and there may be mentioned a branched unit contained in the polycarbonate obtained by the conventional melting method with a large amount, etc. In the present invention, it is the characteristic feature that the ratio of the Structural units (1) to (3) is extremely little.

Incidentally, since the contained ratio of Structural units (1) to (3) is desirably as little as possible, the lower limit is not specifically limited, and may be a detection limit (a lower limit for detection is generally about 1 ppm). In general, Structural units (1) to (3) are each allowed to be contained in an amount of 1 ppm or more (detection lower limit) in terms of a diphenolic acid, and in some cases, 5 ppm or more, or else, 10 ppm or more.

The contained ratio of the Structural units (1) to (3) in the present invention is a converted value in terms of a diphenolic acid. The converted value in terms of a diphenolic acid is a value obtained by subjecting the obtained aromatic polycarbonate resin composition to alkali hydrolysis to a monomer level, after that, measuring a contained ratio of compounds (1) to (3) having the following structures which correspond to the Structural units (1) to (3) in the monomer, respectively, by an LC-MS analysis.

Compound (1) Corresponding to Structural Unit (1):

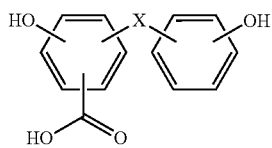

Compound (2) Corresponding to Structural Unit (2):

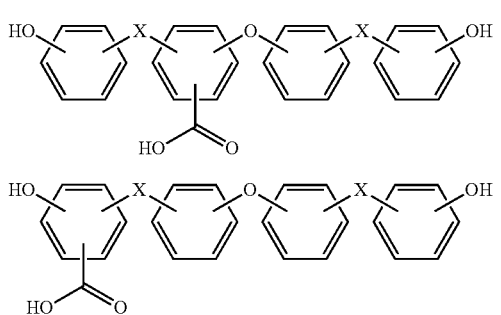

Compound (3) Corresponding to Structural Unit (3):

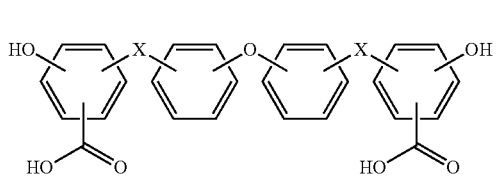

-continued

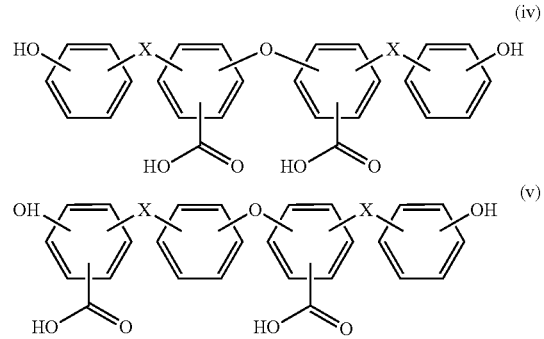

In the skeletal structure of the aromatic polycarbonate resin of the present invention, a structural unit derived from an aliphatic diol compound used in the highly polymerizing step may be contained in addition to the above. In such a case, a ratio of the structural unit derived from the aliphatic diol compound based on the whole mount of the structural units of the highly polymerized aromatic polycarbonate resin is 1 mol % or less, more preferably 0.1 mol % or less.

A weight average molecular weight (Mw) of the aromatic polycarbonate resin of the present invention is preferably 30,000 to 100,000, more preferably 30,000 to 80,000, particularly preferably 35,000 to 75,000, most preferably 40,000 to 65,000, and whereas the resin has a high molecular weight, it also has high fluidity. If the weight average molecular weight is within the above-mentioned range, its moldability and productivity are good when it is used for the uses such as blow molding, extrusion molding, injection molding, etc. Further, physical properties of the resulting molded product such as mechanical property, heat resistance, and organic solvent resistance are good.

In the aromatic polycarbonate resin of the present invention, an N value (a structural viscosity index) represented by the following numerical formula (1) is preferably 1.3 or less, more preferably 1.28 or less, particularly preferably 1.25 or less, most preferably 1.23 or less.

$$N \text{ value}=(\log(Q160 \text{ value})-\log(Q10 \text{ value}))/(\log 160-\log 10) \qquad (1)$$

In the numerical formula (1), Q160 value represents a melt flow volume (ml/sec) (measured by using CFT-500D manufactured by Shimadzu Corporation (hereinbelow the same), calculated from stroke=7.0 to 10.0 mm) per a unit time measured at 280° C. and a load of 160 kg, and Q10 value represents a melt flow volume (ml/sec) (calculated from stroke=7.0 to 10.0 mm) per a unit time measured at 280° C. and a load of 10 kg. (Here, nozzle diameter: 1 mm×nozzle length: 10 mm)

A structural viscosity index "N value" is used as an index of a branching degree of the aromatic polycarbonate resin. The N value in the highly polymerized aromatic polycarbonate resin of the present invention is low, and a contained ratio of the branched structure is little and a ratio of the linear structure is high. Fluidity of a polycarbonate resin generally tends to become high (Q value becomes high) when a ratio of the branched structure is made larger at the same Mw, but the aromatic polycarbonate resin of the present invention accomplishes high fluidity (high Q value) while maintaining the N value to a low value.

(2) Cyclic Carbonate

In the aromatic polycarbonate resin composition of the present invention, 3000 ppm or less of the cyclic carbonate represented by the following formula (h2) is contained. In the aromatic polycarbonate resin composition of the present invention, a cyclic carbonate corresponding to the aliphatic diol compound used as the linking agent is by-produced in the preparation step, after moving the same out of the reaction system, a small amount of a cyclic polycarbonate remains, and such a cyclic polycarbonate is to be contained in the finally obtained aromatic polycarbonate resin composition.

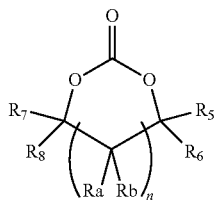

(h2)

In the formula (h2), Ra and Rb each independently represent a hydrogen atom, a halogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring. The halogen atom is preferably a fluorine atom.

$R_5$ to $R_8$ each independently represent a hydrogen atom, a halogen atom or a linear or branched alkyl group having 1 to 5 carbon atoms. The halogen atom is preferably a fluorine atom.

n represents an integer of 0 to 30, preferably 1 to 6, more preferably 1 to 3, particularly preferably 1.

In the formula (h2), Ra and Rb are preferably each independently a hydrogen atom, a halogen atom, a linear or branched alkyl group having 1 to 8 carbon atoms, a cycloalkyl group having 3 to 8 carbon atoms, an aryl group having 6 to 10 carbon atoms, or an alkoxy group having 1 to 8 carbon atoms, or Ra and Rb may be bonded to each other to form an alicyclic ring having 3 to 8 carbon atoms. The halogen atom is preferably a fluorine atom.

$R_5$ to $R_8$ are preferably each independently a hydrogen atom, a fluorine atom or a methyl group. n is preferably an integer of 1 to 6.

In the formula (h2), Ra and Rb are more preferably each independently a hydrogen atom or a linear or branched alkyl group having 1 to 5 carbon atoms, further preferably a linear or branched alkyl group having 1 to 4 carbon atoms. Particularly preferred specific examples may include a methyl group, an ethyl group, a propyl group, an n-butyl group, and an i-butyl group. $R_5$ to $R_8$ are each more preferably a hydrogen atom. n is more preferably an integer of 1 to 3.

The cyclic carbonate represented by the formula (h2) is more preferably a compound represented by the following formula (h3). In the formula (h3), n, Ra and Rb are the same as those defined in the formula (h2).

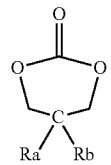

(h3)

Specific examples of the above-mentioned cyclic carbonate may include the compounds having the structures shown below.

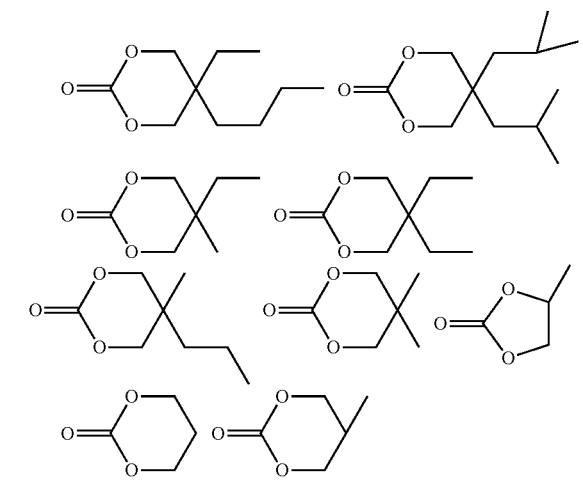

A content of the above-mentioned cyclic carbonate represented by the formula (h2) in the aromatic polycarbonate resin composition of the present invention is 3000 ppm or less, preferably 1000 ppm or less, more preferably 500 ppm or less, particularly preferably 300 ppm or less. A lower limit of the content of the cyclic polycarbonate is generally the detection limit value, and preferably 0.0005 ppm or more. By containing such a cyclic carbonate, fluidity of the polycarbonate resin composition may be improved. Incidentally, if the content of the cyclic carbonate is too high, there may be demerits such as lowering in resin strength, etc.

(3) Other Contained Components

In the aromatic polycarbonate resin composition of the present invention, the catalyst deactivator used in the preparation step may be contained. By containing the catalyst deactivator, thermal stability of the resin composition is further improved.

A content of the catalyst deactivator in the aromatic polycarbonate resin composition of the present invention is not particularly limited, and preferably 3 ppm or more, more preferably 5 ppm or more. If the content of the catalyst deactivator is 3 ppm or more, an improved effect of thermal stability becomes remarkable.

An upper limit of the content of the catalyst deactivator is not particularly limited, and preferably 30 ppm or less, more preferably 20 ppm or less.

Specific examples of the catalyst deactivator to improve thermal stability may include aromatic sulfonic acids such as p-toluenesulfonic acid; aromatic sulfonic acid esters such as butyl paratoluenesulfonate; aromatic sulfonic acid salts such as tetrabutyl phosphonium dodecylbenzenesulfonate, and tetrabutylammonium paratoluenesulfonate; organic halides such as stearic acid chloride, butyric acid chloride, benzoyl chloride, toluenesulfonic acid chloride, and benzyl chloride; alkyl sulfates such as dimethyl sulfate; phosphoric acids; and phosphorous acids, etc.

Among these, the catalyst deactivator selected from the group consisting of paratoluenesulfonic acid, butyl paratoluenesulfonate, tetrabutylphosphonium dodecylbenzenesulfonate, and tetrabutyl ammonium paratoluenesulfonate is suitably used.

In the aromatic polycarbonate resin composition of the present invention, a heat resistant stabilizer, a hydrolysis stabilizer, an antioxidant, a pigment, a dye, a reinforcing agent, a filler, a UV absorber, a lubricant, a mold-releasing agent, a nucleating agent, a plasticizer, a fluidity improver, an antistatic agent, etc., may be further contained.

As the heat resistant stabilizer, there may be used conventionally known material such as triphenylphosphine (P-Ph$_3$), etc.

Examples of antioxidant to be used may include tris-(2,4-di-t-butylphenyl)phosphite, n-octadecyl-β-(4'-hydroxy-3', 5'-di-t-butylphenyl)propionate, pentaerythrityl-tetrakis[3-(3,5-di-t-butyl-4-hydroxyphenyl)propionate], n-octadecyl-β-(4'-hydroxy-3',5'-di-t-butylphenyl)propionate, 1,6-hexanediolbis[3-(3,5-di-t-butyl-4-hydroxyphenyl)propionate], triethylene glycol-bis-3-(3-t-butyl-4-hydroxy-5-methylphenylpropionate), 3,9-bis[2-{3-(3-t-butyl-4-hydroxy-5-methylphenyl)propionyloxy}-1,1-dimethylethyl]-2,4,8,10-tetraoxaspiro[5.5]undecane, triphenyl phosphite, trisnonylphenyl phosphite, tris-(2,4-di-t-butylphenyl)phosphite, tetrakis(2,4-di-t-butylphenyl)-4,4'-biphenylene diphosphonite, tricresyl phosphite, 2,2-methylenebis(4,6-di-t-butylphenyl)octyl phosphite, etc. Among these, preferred are tris-(2,4-di-t-butylphenyl)phosphite and n-octadecyl-β-(4'-hydroxy-3',5'-di-t-butylphenyl)propionate.

(4) Aromatic Polycarbonate Resin Composition

The aromatic polycarbonate resin composition of the present invention has good hue. Evaluation of the hue of the aromatic polycarbonate resin is generally represented by a YI value. In general, the YI value of a branched aromatic polycarbonate resin obtained by the interfacial polymerization method shows 0.8 to 1.0. On the other hand, a high molecular weight product of the aromatic polycarbonate obtained by the melt polymerization method shows the YI value of 1.7 to 2.0 due to lowering in quality accompanied by the preparation step. However, the YI value of the highly polymerized aromatic polycarbonate resin obtained by the preparation process according to the present invention shows the equivalent YI value to the aromatic polycarbonate obtained by the interfacial polymerization method, and worsening in hue is not observed.

Also, the aromatic polycarbonate resin composition of the present invention has high heat resistance, more specifically, has a high molecular weight retaining ratio (an index showing how much lowering in molecular weight is suppressed when heat detention is applied under high temperatures). A molecular weight (Mw) retaining ratio after the heat detention test (at 360° C. for 60 minutes) of the aromatic polycarbonate resin composition of the present invention is preferably 50% or more, more preferably 70% or more.

The aromatic polycarbonate resin composition of the present invention can be preferably utilized for the uses such as various molded products, sheets, films, etc., obtained by injection molding or blow molding (hollow molding), extrusion molding, injection blow molding, rotational molding, compression molding, etc. When it is used for these uses, it may be the resin composition of the present invention alone or may be a blended material with the other polymer(s) without any problem. A processing such as a hard coating and laminating can be preferably used depending on the uses.

The aromatic polycarbonate resin composition of the present invention is particularly preferably used for extrusion molding, blow molding, injection molding, etc. The obtained molded product may be mentioned an extrusion molded product, a hollow molded product, and an injection molded product of a precision part or a thin product. The injection molded product of a precision part or a thin product preferably has a thickness of 1 µm to 3 mm.

Specific examples of the molded product may include optical media products such as a compact disk, a digital video disk, a mini disk, and a magneto-optical disk; optical communication media such as an optical fiber; optical components such as head lamp lens of automobiles; lens components of cameras; parts of optical devices such as a siren light cover, and an illumination light cover; substitutes for window glass of vehicles such as a train and an automobile; substitutes for window glass of domestic; lighting parts such as a sunshine roof and a roof of green house; lenses or housings of goggles, sunglasses and eyeglasses; housings of OA apparatuses such as a copying machine, facsimile and a personal computer; housings of home electric appliances such as a television and an electronic oven; electronic parts uses such as a connector and an IC tray; protective equipments such as a helmet, a protector and a face shield; household utensils such as a feeding bottle, a tableware and a tray; medical use products such as an artificial dialysis case and an artificial tooth; and sundries such as packaging materials, writing implements and stationery, but it is not limited thereto.

As the uses of the aromatic polycarbonate resin composition of the present invention, there may be particularly preferably mentioned the following molded products which require high strength and precise moldability:

as an automobile part, head lamp lens, metering board, sunshine roof, etc., further a substitute for a window made of a glass or outer parts;

various films such as a liquid crystal display, a light-guiding plate, an optical disk substrate;

building materials such as a transparent sheet; and as a structural member, housings of a personal computer, a printer, a liquid crystal television set, etc.

2. Preparation Process of Aromatic Polycarbonate Resin Composition

The aromatic polycarbonate resin composition of the present invention is prepared by the process including a highly polymerizing step of reacting the aromatic polycarbonate prepolymer and the aliphatic diol compound having a specific structure in the presence of a transesterification catalyst to obtain a highly polymerized aromatic polycarbonate resin, and a cyclic carbonate-removing step of removing at least part of the cyclic carbonate by-produced in the highly polymerizing step out of the reaction system.

(1) Aliphatic Dial Compound

The aliphatic diol compound refers to a dialcohol compound having two hydroxyl groups each bonded to a non-aromatic carbon atom. The aliphatic diol compound encompasses a compound having an aromatic ring moiety in its molecular structure, but does not encompass a phenol compound having a hydroxyl group bonded to an aromatic ring.

The aliphatic diol compound to be used in the preparation process of the aromatic polycarbonate resin composition of the present invention is a compound represented by the following formula (g2).

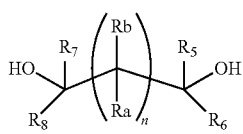
(g2)

In the formula (g2), Ra and Rb each independently represent a hydrogen atom, a halogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring. The halogen atom is preferably a fluorine atom.

$R_5$ to $R_8$ each independently represent a hydrogen atom, a halogen atom or a linear or branched alkyl group having 1 to 5 carbon atoms. The halogen atom is preferably a fluorine atom.

n represents an integer of 0 to 30, preferably 1 to 6, more preferably 1 to 3, particularly preferably 1.

In the formula (g2), Ra and Rb are each preferably and independently a hydrogen atom, a halogen atom, a linear or branched alkyl group having 1 to 8 carbon atoms, a cycloalkyl group having 3 to 8 carbon atoms, an aryl group having 6 to 10 carbon atoms, or an alkoxy group having 1 to 8 carbon atoms, or Ra and Rb may be bonded to each other to form an alicyclic ring having 3 to 8 carbon atoms. The halogen atom is preferably a fluorine atom.

$R_5$ to $R_8$ are each preferably and independently a hydrogen atom, a fluorine atom or a methyl group. n preferably represents an integer of 1 to 6.

In the formula (g2), Ra and Rb are each more preferably and independently a hydrogen atom or a linear or branched alkyl group having 1 to 5 carbon atoms, further preferably a linear or branched alkyl group having 1 to 4 carbon atoms. Particularly preferred examples may include a methyl group, an ethyl group, a propyl group, an n-butyl group, and an i-butyl group. $R_5$ to $R_8$ are each more preferably a hydrogen atom. n is more preferably an integer of 1 to 3.

The aliphatic diol compound represented by the formula (g2) is more preferably a compound represented by the following formula (g3). In the formula (g3), Ra and Rb are the same as those in the formula (g2).

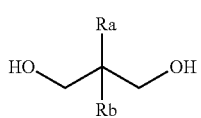
(g3)

In the formula (g3), Ra and Rb are more preferably each independently a hydrogen atom or a linear or branched alkyl group having 1 to 5 carbon atoms, more preferably a linear or branched alkyl group having 1 to 4 carbon atoms, further preferably a linear or branched alkyl group having 2 to 4 carbon atoms. Particularly preferred specific examples may include a methyl group, an ethyl group, a propyl group, an n-butyl group, and an i-butyl group, preferably an ethyl group, a propyl group, an n-butyl group, and an i-butyl group.

Examples of the aliphatic diol compound may include 2-butyl-2-ethylpropane-1,3-diol, 2,2-diisobutylpropane-1,3-diol, 2-ethyl-2-methylpropane-1,3-diol, 2,2-diethylpropane-1,3-diol, 2-methyl-2-propylpropane-1,3-diol, propane-1,2-diol, propane-1,3-diol, ethane-1,2-diol (1,2-ethylene glycol), 2,2-diisoamylpropane-1,3-diol, and 2-methylpropane-1,3-diol.

Also, other examples of the above-mentioned aliphatic diol compound may include the compounds having the following structural formulae.

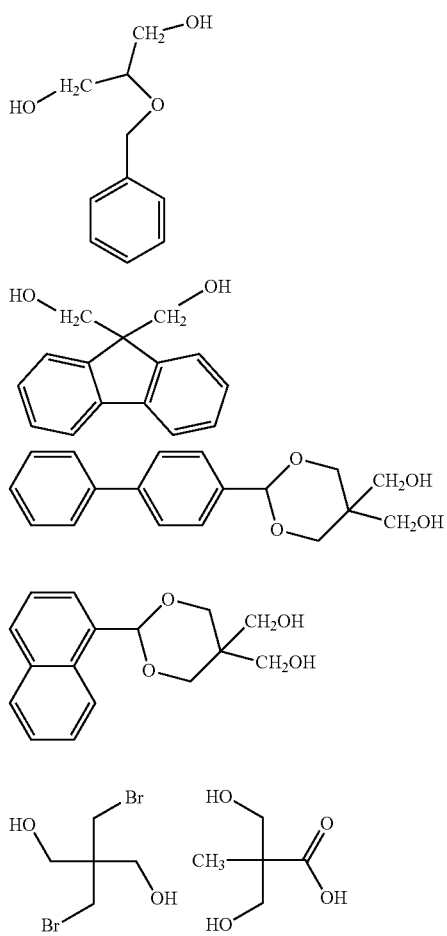

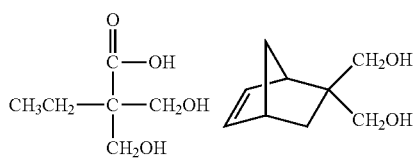

-continued

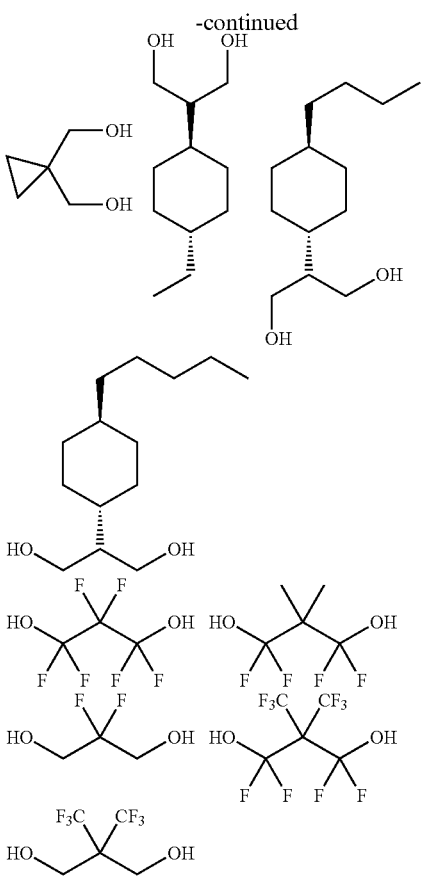

Among these, particularly preferred is a compound selected from the group consisting of 2-butyl-2-ethylpropane-1,3-diol, 2,2-diisobutylpropane-1,3-diol, 2-ethyl-2-methylpropane-1,3-diol, 2,2-diethylpropane-1,3-diol and 2-methyl-2-propylpropane-1,3-diol.

(2) Aromatic Polycarbonate Prepolymer

The aromatic polycarbonate prepolymer obtained by the preparation process of the present invention is a polycondensed polymer comprising, as a main recurring unit, the structure represented by the formula (II) which constitutes the aromatic polycarbonate resin of the present invention.

The preparation process of the present invention contains a step of linking such an aromatic polycarbonate prepolymer with a linking agent comprising an aliphatic diol compound having the structure represented by the formula (g2) by transesterification under reduced pressure. According to this procedure, an aromatic polycarbonate resin having merits of linked and highly polymerized polycarbonate that is high molecular weight and gives high fluidity, while maintaining the inherent characteristics of the polycarbonate resin such as impact resistance, etc., and yet, having little ratio of the unit having the heterologous structures represented by the formulae (1) to (3) and markedly improved heat resistance thereof, can be obtained.

Such an aromatic polycarbonate prepolymer can be easily obtained by either of the conventionally known transesterification method which reacts the aromatic dihydroxy compound which induces the structural unit represented by the formula (II) with a carbonic acid diester in the presence of a basic catalyst, or by the conventionally known interfacial polycondensation method which reacts the aromatic dihydroxy compound with phosgene, etc., in the presence of an acidic binding agent.

As the aromatic dihydroxy compound which induces the structural unit represented by the formula (II), there may be mentioned the compound represented by the formula (II").

The aromatic polycarbonate prepolymer to be used in the present invention may be a material synthesized by the interfacial polymerization method or a material synthesized by the melt polymerization method, or may be a material synthesized by the method of the solid phase polymerization method or the thin film polymerization method, etc. It is also possible to use a polycarbonate recovered from used products such as used disk molded product, etc. These polycarbonates may be mixed and utilized as a polymer before the reaction without any problem. For example, the polycarbonate polymerized by the interfacial polymerization method and the polycarbonate polymerized by the melt polymerization method may be mixed, and, the polycarbonate polymerized by the melt polymerization method or the interfacial polymerization method and the polycarbonate recovered from the used disk molded product, etc., may be mixed and used without any problem.

As the aromatic polycarbonate prepolymer to be used in the present invention, there may be preferably mentioned an end-capped aromatic polycarbonate prepolymer which satisfies a specific condition(s).

That is, it is preferred that at least part of the aromatic polycarbonate prepolymer is capped with a terminal group or a terminal phenyl group (hereinbelow, also referred to as "end-capped terminal group") derived from the aromatic monohydroxy compound.

With regard to a ratio of the end-capped terminal group, when a ratio of the end-capped terminal group is 60 mol % or more based on the whole terminal amount, the effect is particularly remarkable. Also, a terminal phenyl group concentration (a ratio of the end-capped terminal group based on the whole constitutional units) is 2 mol % or more, preferably 2 to 20 mol %, particularly preferably 2 to 12 mol %. If the terminal phenyl group concentration is 2 mol % or more, the reaction with the aliphatic diol compound rapidly proceeds, and the effects specific in the present invention are particularly markedly shown. A ratio of the end-capped terminal amount based on the whole terminal amount of the polymer can be analyzed by the $^1$H-NMR analysis of the polymer.

Also, the terminal hydroxyl group concentration can be measured by spectrometry with Ti complex. The terminal hydroxyl group concentration by the above evaluation is preferably 1,500 ppm or less, further preferably 1,000 ppm or less. If the hydroxyl group terminal exceeds the above range or the end-capped terminal amount is less than the above range, there is a possibility that sufficiently highly polymerizing effects cannot be obtained by the transesterification with the aliphatic diol compound.

The "whole terminal group amount of the polycarbonate" or "whole terminal group amount of the aromatic polycarbonate prepolymer" herein mentioned is calculated like that, for example, when there is 0.5 mol of branch-less polycarbonate (that is, a linear polymer), the whole terminal group amount is calculated to be 1 mol.

Specific examples of the end-capped terminal group may include terminal groups such as a phenyl terminal, a cresyl terminal, an o-tolyl terminal, a p-tolyl terminal, a p-t-butylphenyl terminal, a biphenyl terminal, an o-methoxycarbonylphenyl terminal, a p-cumylphenyl terminal, etc.

Among these, terminal groups constituted by an aromatic monohydroxy compound having a low boiling point which is easily removed from the reaction system of the transesterification with the aliphatic diol compound are preferred, and a phenyl terminal, a p-tert-butylphenyl terminal, etc., are particularly preferred.

Such an end-capped terminal group can be introduced in the interfacial method by using a terminating agent at the time of preparing the aromatic polycarbonate prepolymer. Specific examples of the terminating agent may include p-tert-butylphenol, phenol, p-cumylphenol, a long chain alkyl-substituted phenol, etc. An amount of the terminating agent to be used can be optionally determined depending on a terminal amount of the desired aromatic polycarbonate prepolymer (that is, the molecular weight of the desired aromatic polycarbonate prepolymer), a reaction apparatus, reaction conditions, etc.

In the melting method, an end-capped terminal group can be introduced by excessively using a carbonic acid diester such as diphenylcarbonate to an aromatic dihydroxy compound at the time of preparing an aromatic polycarbonate prepolymer. Whereas it depends on an apparatus to be used for the reaction and reaction conditions, the carbonic acid diester is specifically used in an amount of 1.00 to 1.30 mol, more preferably 1.02 to 1.20 mol based on 1 mol of the aromatic dihydroxy compound. According to this procedure, an aromatic polycarbonate prepolymer satisfying the above-mentioned end-capped terminal amount can be obtained.

In the present invention, as the aromatic polycarbonate prepolymer, an end-capped terminal polycondensation polymer obtained by reacting (transesterification) the aromatic dihydroxy compound with the carbonic acid diester is preferably used.

When the aromatic polycarbonate prepolymer is to be produced, in combination with the above-mentioned aromatic dihydroxy compound, a polyfunctional compound having 3 or more functional groups in the molecule may be used. As such a polyfunctional compound preferably used, there may be mentioned a compound having a phenolic hydroxyl group and a carboxyl group.

Further, when the aromatic polycarbonate prepolymer is to be prepared, in combination with the above-mentioned aromatic dihydroxy compound, a dicarboxylic acid compound may be used to prepare a polyester carbonate. The dicarboxylic acid compound may be preferably terephthalic acid, isophthalic acid, naphthalenedicarboxylic acid, 1,4-cyclohexanedicarboxylic acid, etc., and these dicarboxylic acids are preferably employed to use as an acid chloride or an ester compound. Also, at the time of preparing a polyester carbonate resin, the dicarboxylic acid is preferably used in the range of 0.5 to 45 mol %, more preferably in the range of 1 to 40 mol % based on 100 mol % of the total of the dihydroxy component and the dicarboxylic acid component.

A molecular weight of the aromatic polycarbonate prepolymer is desirably 5,000 to 60,000. It is more preferably an aromatic polycarbonate prepolymer with a Mw in the range of 10,000 to 50,000, further preferably 10,000 to 40,000, particularly preferably 20,000 to 35,000.

If the aromatic polycarbonate prepolymer having a high molecular weight exceeding the above range is used, the aromatic polycarbonate prepolymer itself has high viscosity, so that preparation of the prepolymer may be required to be carried out at high temperature, high shearing for a long period of time, and/or the reaction with the aliphatic diol compound may be required to be carried out at high temperature, high shearing for a long period of time.

(3) Cyclic Carbonate

In the present invention, by acting the aliphatic diol compound on the end-capped aromatic polycarbonate prepolymer in the presence of a transesterification catalyst under reduced pressure conditions, the aromatic polycarbonate prepolymer is highly polymerized. This reaction proceeds with a high speed under mild conditions, and higher polymerization is accomplished. That is, after the aromatic polycarbonate prepolymer caused a cleavage reaction by the aliphatic diol, the reaction of the aliphatic diol compound and the aromatic polycarbonate prepolymer proceeds rapidly than the reaction of forming the aliphatic polycarbonate unit by transesterification.

Here, in the method of reacting the aliphatic diol compound having the specific structure of the present invention, the reaction of the aromatic polycarbonate prepolymer and the aliphatic diol compound proceeds and also a cyclic carbonate which is a cyclic material having the structure corresponding to the structure of the aliphatic diol compound is by-produced. By removing the by-produced cyclic carbonate out of the reaction system, higher polymerization of the aromatic polycarbonate prepolymer proceeds, and finally an aromatic polycarbonate resin having substantially the same structure as that of the conventional homopolycarbonate (for example, a homopolycarbonate resin derived from bisphenol A) can be obtained.

Incidentally, the highly polymerizing step and the cyclic carbonate-removing step may not necessarily be physically and temporally separate steps, and actually carried out simultaneously. The preferred preparation process of the present invention includes a step of reacting the aromatic polycarbonate and the aliphatic diol compound in the presence of a transesterification catalyst to obtain a highly polymerized aromatic polycarbonate resin as well as removing at least part of the cyclic carbonate by-produced in the highly polymerizing reaction out of the reaction system.

The by-produced cyclic carbonate is a compound having the structure represented by the following formula (h2).

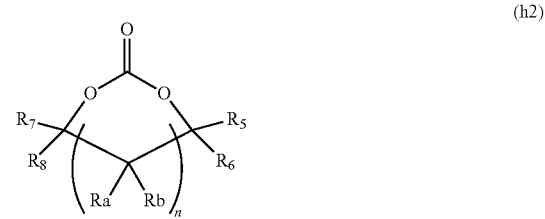

(h2)

In the formula (h2), Ra and Rb each independently represent a hydrogen atom, a halogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring. The halogen atom is preferably a fluorine atom.

$R_5$ to $R_8$ each independently represent a hydrogen atom, a halogen atom or a linear or branched alkyl group having 1 to 5 carbon atoms. The halogen atom is preferably a fluorine atom.

n represents an integer of 0 to 30, preferably 1 to 6, more preferably 1 to 3, particularly preferably 1.

In the formula (h2), Ra and Rb are preferably each independently a hydrogen atom, a halogen atom, a linear or branched alkyl group having 1 to 8 carbon atoms, a cycloalkyl group having 3 to 8 carbon atoms, an aryl group having 6 to 10 carbon atoms, or an alkoxy group having 1 to 8 carbon atoms, or Ra and Rb may be bonded to each other to form an alicyclic ring having 3 to 8 carbon atoms. The halogen atom is preferably a fluorine atom.

$R_5$ to $R_8$ are preferably each independently a hydrogen atom, a fluorine atom or a methyl group. n is preferably an integer of 1 to 6.

In the formula (h2), Ra and Rb are more preferably each independently a hydrogen atom or a linear or branched alkyl group having 1 to 5 carbon atoms, further preferably a linear or branched alkyl group having 1 to 4 carbon atoms. Particularly preferred specific examples may include a methyl group, an ethyl group, a propyl group, an n-butyl group, and an i-butyl group. $R_1$ to $R_4$ are more preferably each a hydrogen atom. n is more preferably an integer of 1 to 3.

The cyclic carbonate represented by the formula (h2) is more preferably a compound represented by the following formula (h3). In the formula (h3), n, Ra and Rb are each the same as those defined in the above-mentioned formula (h2).

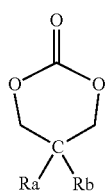

(h3)

Specific examples of the above-mentioned cyclic carbonate may include the compounds having the structures shown below.

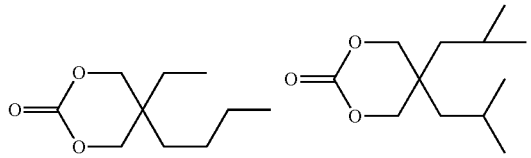

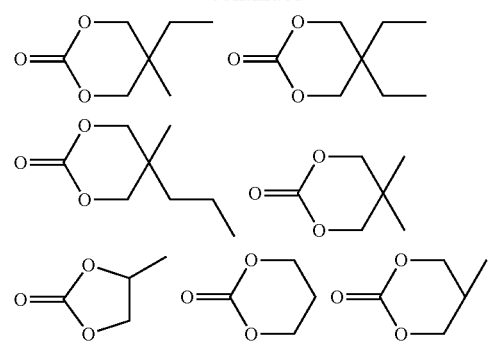

The preparation process using the aliphatic diol compound having the structure represented by the above-mentioned formula (g2) of the present invention has the merit that it can be highly polymerized with a high speed as compared with the preparation process of the polycarbonate by the conventional melting method. This is the common merit as the high molecular weight polycarbonate resin obtained by the linking higher polymerization method using the other aliphatic diol compounds as the linking agent found out by the present inventors.

On the other hand, according to the preparation process of the present invention, with the progress of highly polymerizing reaction, a cyclic carbonate having the specific structure is by-produced. And after removing the by-produced cyclic carbonate out of the reaction system, a high molecular weight polycarbonate resin having substantially the same skeletal structure as that of the homopolycarbonate resin can be obtained. The by-produced cyclic carbonate has the structure corresponding to the aliphatic diol compound to be used, and is considered to be a cyclic material derived from the aliphatic diol compound, but the reaction mechanism that the cyclic carbonate is by-produced with the higher polymerization is not necessarily clear.

For example, mechanisms shown in the following Scheme (1) or (2) can be considered, but it is not necessarily clear. It is not limited to the specific reaction mechanism so long as within the above range of the preparation process using the aliphatic diol compound having the structure represented by the formulae (g2) to (g3) of the present invention is to react the aliphatic diol compound as a linking agent with the aromatic polycarbonate prepolymer to make the aromatic polycarbonate prepolymer linked and highly polymerized product, and simultaneously to remove the cyclic carbonate having the structure corresponding to the structure of the by-produced aliphatic diol compound.

Scheme (1):

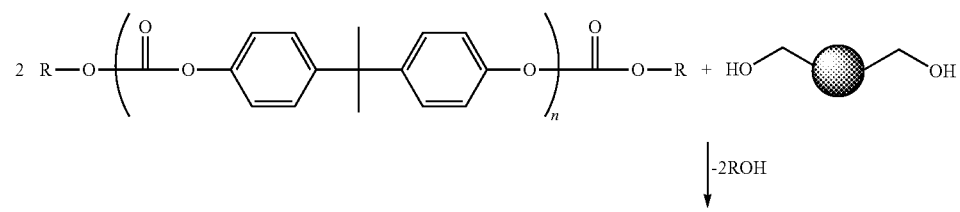

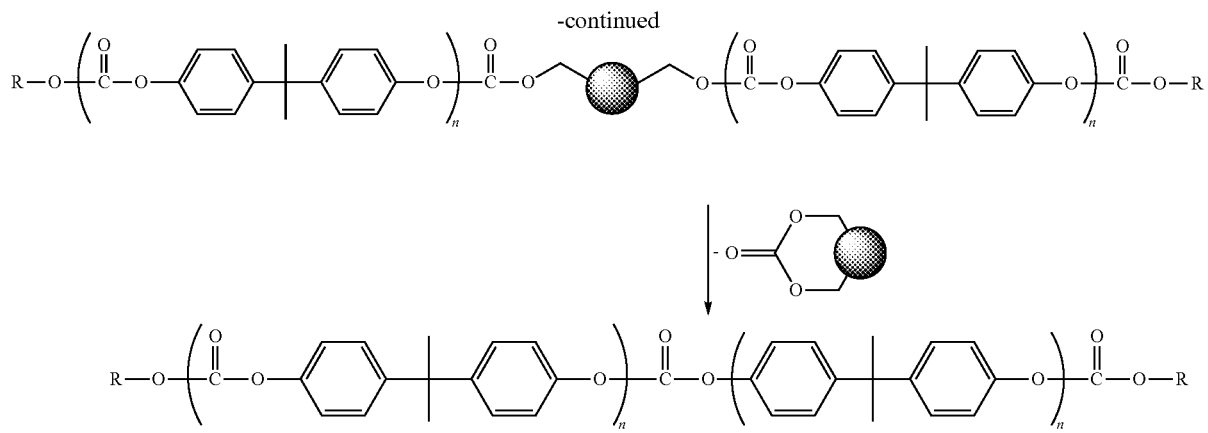

Scheme (2):

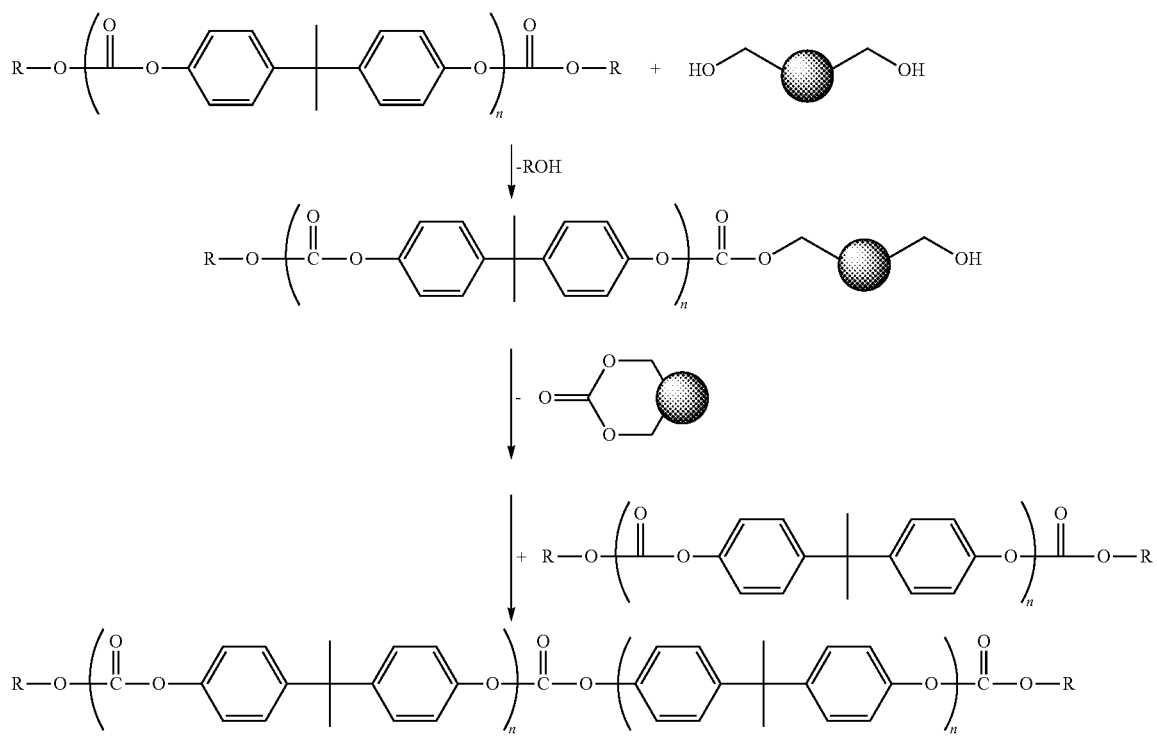

The highly polymerized aromatic polycarbonate resin obtained by the preparation process using the aliphatic diol compound having the structure represented by the formula (g2) of the present invention does not substantially contain the structural unit derived from the aliphatic diol compound, and the skeletal structure of the resin is substantially the same as that of the homopolycarbonate resin.

That is, since the structural unit derived from the aliphatic diol compound which is the linking agent is not contained in the skeletal structure or even if it is contained, the amount is extremely little, the resulting resin has extremely high thermal stability and excellent heat resistance. On the other hand, it can possess excellent qualities, while having the same skeletal structure as that of the conventional homopolycarbonate resin, such as a low N value, less ratio of the unit having a heterologous structure, and excellent in color tone, etc.

Here, the unit having a heterologous structure refers to a unit having a structure which has a possibility of causing unfavorable action and effect, and there may be mentioned a branched unit contained in the polycarbonate obtained by the conventional melting method with a large amount, etc. According to the process of the present invention, a ratio of the heterologous structure unit represented by either of the formula (1) or (2) can be particularly reduced. More specifically, a ratio of the heterologous structure unit represented by either of the formula (1) or (2) can be reduced to 2000 ppm or less in terms of a diphenolic acid.

Incidentally, in the skeletal structure of the aromatic polycarbonate resin composition obtained by the preparation process of the present invention, a structural unit derived from the aliphatic diol compound may be contained. In such a case, a ratio of the structural unit derived from the aliphatic diol compound based on the whole structural unit amount of the highly polymerized aromatic polycarbonate resin is 1 mol % or less, more preferably 0.1 mol % or less.

(4) Preparation Process

In the following, detailed conditions of the preparation process of the aromatic polycarbonate resin composition according to the present invention are explained.
(i) Addition of Aliphatic Diol Compound In the preparation process of the present invention, to the aromatic polycarbonate prepolymer is added the aliphatic diol compound represented by the formula (g2) and mixed, and highly polymerizing reaction (transesterification) is carried out in a highly polymerizing reactor.

An amount of the aliphatic diol compound to be used is preferably 0.01 to 1.0 mol based on 1 mol of the whole terminal group amount of the aromatic polycarbonate prepolymer, more preferably 0.1 to 1.0 mol, further preferably 0.2 to 0.7 mol. However, when a material having a relatively low boiling point is used, such a material may be added with an excessive amount in consideration with the possibility that a part of which is passed through the reaction system without participating in the reaction by volatilization, etc., depending on the reaction conditions. For example, it may be added with the maximum amount of 50 mol, preferably 10 mol, more preferably 5 mol based on 1 mol of the whole terminal group amount of the aromatic polycarbonate prepolymer.

A method of adding and mixing the aliphatic diol compound is not particularly limited, and when a material having a relatively high boiling point (boiling point: about 350° C. or higher) is used as the aliphatic diol compound, the aliphatic diol compound is preferably directly supplied to a highly polymerizing reactor under higher vacuum conditions with a pressure reduction degree of 10 torr (1333 Pa or lower) or lower. It is more preferably a pressure reduction degree of 2.0 torr or lower (267 Pa or lower), more preferably 0.01 to 1 torr (1.3 to 133 Pa or lower). If the pressure reduction degree at the time of supplying the aliphatic diol compound to the highly polymerizing reactor is insufficient, a cleavage reaction of the prepolymer main chain due to the by-product (phenol) proceeds, and there is a case where the reaction time of the reaction mixture cannot help making longer for higher polymerization.

On the other hand, when a material having a relatively low boiling point (boiling point: about lower than 350° C.) is used as the aliphatic diol compound, the aromatic polycarbonate prepolymer and the aliphatic diol compound can be mixed under a relatively gentle pressure reduction degree. For example, the aromatic polycarbonate prepolymer and the aliphatic diol compound are mixed at a pressure near to the normal pressure to prepare a prepolymer mixture, then, the prepolymer mixture is supplied to a highly polymerizing reaction under reduced pressure conditions, so that even when it is an aliphatic diol compound having a relatively low boiling point, volatilization can be restrained at the minimum degree and it is not necessary to use the compound excessively.
(ii) Transesterification (Highly Polymerizing Reaction)

A temperature to be used for transesterification (highly polymerizing reaction) of the aromatic polycarbonate prepolymer and the aliphatic diol compound is preferably in the range of 240° C. to 320° C., further preferably 260° C. to 310° C., more preferably 280° C. to 310° C.

Also, the pressure reduction degree is preferably 13 kPaA (100 torr) or lower, further preferably 1.3 kPaA (10 torr) or lower, more preferably 0.67 to 0.013 kPaA (5 to 0.1 torr).

As the basic compound catalyst to be used in the transesterification, there may be particularly mentioned an alkali metal compound and/or an alkaline earth metal compound, a nitrogen-containing compound, etc.

Such a compound preferably used may include an organic acid salt, an inorganic salt, an oxide, a hydroxide, a hydride or an alkoxide of an alkali metal and alkaline earth metal compound, a quaternary ammonium hydroxide and a salt thereof, or an amine, etc., and these compounds may be used alone or in combination of two or more.

Specific examples of the alkali metal compound used may include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium tetraphenylborate, sodium benzoate, potassium benzoate, cesium benzoate, lithium benzoate, disodium hydrogen phosphate, dipotassium hydrogen phosphate, dilithium hydrogen phosphate, disodium phenyl phosphate, sodium gluconate, disodium salt, dipotassium salt, dicesium salt or dilithium salt of bisphenol A, and sodium salt, potassium salt, cesium salt or lithium salt of phenol, etc.

Specific examples of the alkaline earth metal compound used may include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenyl phosphate, etc.

Specific examples of the nitrogen-containing compound to be used may include quaternary ammonium hydroxides having an alkyl group and/or an aryl group such as tetramethylammonium hydroxide, tetraethylammonium hydroxide, tetrapropylammonium hydroxide, tetrabutylammonium hydroxide, and trimethylbenzylammonium hydroxide, tertiary amines such as triethylamine, and dimethylbenzylamine, triphenylamine, secondary amines such as diethylamine, dibutylamine, primary amines such as propylamine, and butylamine, imidazoles such as 2-methylimidazole, 2-phenylimidazole, and benzoimidazole, or bases or basic salts such as ammonia, tetramethylammonium borohydride, tetrabutylammonium borohydride, tetrabutylammonium tetraphenylborate, and tetraphenylammonium tetraphenylborate.

The transesterification catalyst preferably used is a salt of zinc, tin, zirconium, or lead, and these may be used alone or in combination of two or more.

Specific examples of the transesterification catalyst to be used may include zinc acetate, zinc benzoate, zinc 2-ethylhexanoate, tin(II) chloride, tin(IV) chloride, tin(II) acetate, tin(IV) acetate, dibutyl tin dilaurate, dibutyl tin oxide, dibutyl tin dimethoxide, zirconium acetylacetonate, zirconium oxyacetate, zirconium tetrabutoxide, lead(II) acetate, lead (IV) acetate, etc.

These catalysts are used with a ratio of $1 \times 10^{-9}$ to $1 \times 10^{-3}$ mol, preferably a ratio of $1 \times 10^{-7}$ to $1 \times 10^{-5}$ mol based on 1 mol of the total aromatic dihydroxy compound.

(iii) Cyclic Carbonate-Removal Step

According to the process of the present invention, the aromatic polycarbonate prepolymer is highly polymerized by the highly polymerizing reaction and simultaneously at least part of the cyclic carbonate by-produced by the reaction is removed out of the reaction system. By removing the by-produced cyclic carbonate out of the reaction system, a highly polymerizing reaction of the aromatic polycarbonate prepolymer proceeds.

As the method for removing the cyclic carbonate, there may be mentioned, for example, a method of removing the same with a similarly by-produced phenol and an unreacted aliphatic diol compound, etc., by distillation from the reaction system. A temperature at the time of removing out of the reaction system by distillation is 260 to 320° C.

As for the removal of the cyclic carbonate, at least part of the by-produced cyclic carbonate is carried out. It is most preferred to remove whole the by-produced cyclic carbonate, but it is generally difficult to completely remove it. When it cannot be completely removed, it is allowed to remain the cyclic carbonate in the polycarbonate resin product. A preferred upper limit of the remaining amount in the product is 3000 ppm. That is, in the preparation process using the aliphatic diol compound having the structure represented by the formula (g2) of the present invention, an aromatic polycarbonate resin composition can be obtained, in which the cyclic carbonate having the structure represented by the above-mentioned formula (h2) is contained in an amount of 3000 ppm or less, preferably 1000 ppm or less, more preferably 500 ppm or less, particularly preferably 300 ppm or less. In such a case, a lower limit of a contained ratio of the cyclic carbonate having the structure represented by the formula (h2) is generally the detection limit value, and is preferably 0.0005 ppm or more.

Incidentally, the contained ratio of the cyclic carbonate is a value measured by GC-MS.

The cyclic carbonate distilled off out of the reaction system can be then recovered and reutilized (recycling) through the steps of hydrolysis, purification, etc. The phenol distilled off with the cyclic carbonate can be similarly recovered, and reutilized by supplying to the diphenylcarbonate preparation step.

(iv) Other Production Conditions

In the present invention, according to the transesterification of the aromatic polycarbonate prepolymer and the aliphatic diol compound, it is preferred to heighten the weight average molecular weight (Mw) of the aromatic polycarbonate resin after the reaction 5,000 or more higher than the weight average molecular weight (Mw) of the aromatic polycarbonate prepolymer, more preferably 10,000 or more higher, further preferably 15,000 or more higher.

As a kind of the apparatus or a material of the reaction vessel to be used for the transesterification with the aliphatic diol compound, there may be used any conventionally known material, and the reaction may be carried out either by the continuous system or the batch system. The reaction apparatus to be used for carrying out the above-mentioned reaction may be a vertical type apparatus equipped with an anchor mixing impeller, Maxblend® mixing impeller, helical ribbon type mixing impeller, etc., a horizontal type apparatus equipped with a paddle blade, lattice blade, spectacle-shaped blade, etc., or an extruder type apparatus equipped with a screw. In addition, a reaction apparatus in which the above are optionally used in combination in view of the viscosity of the polymerized material is suitably used. It is preferred to use an apparatus having a blade which has good horizontal type stirring efficiency, and having a unit which can be made under reduced pressure conditions.

Further preferably, a twin-screw extruder or a horizontal type reactor having a polymer seal and having a devolatilization structure is suitable.

As the material of the apparatus, a material which does not affect to the color tone of polymer including a stainless such as SUS310, SUS316 and SUS304, etc., nickel, nitrided steel, etc., is preferred. Also, to the inside (the portion contacting with the polymer) of the apparatus, buffing or electrolytic polishing may be applied, or a metal plating treatment such as chromium, etc., may be applied.

In the present invention, a deactivator of the catalyst may be used to the polymer heightened in the molecular weight. In general, a method of deactivating the catalyst by adding a conventionally known acidic substance is suitably carried out. Specific examples of these substances may include aromatic sulfonic acids such as p-toluenesulfonic acid, etc.; aromatic sulfonic acid esters such as butyl paratoluenesulfonate; aromatic sulfonic acid salts such as tetrabutyl phosphonium dodecylbenzenesulfonate, and tetrabutylammonium paratoluenesulfonate; organic halides such as stearic acid chloride, butyric acid chloride, benzoyl chloride, toluenesulfonic acid chloride, and benzyl chloride; alkyl sulfates such as dimethyl sulfate; phosphoric acids; and phosphorous acids, etc.

Among these, the catalyst deactivator selected from the group consisting of paratoluenesulfonic acid, butyl paratoluenesulfonate, tetrabutylphosphonium dodecylbenzenesulfonate, and tetrabutyl ammonium paratoluenesulfonate can be suitably used.

The catalyst deactivator can be added to the polycarbonate resin by the conventionally known method after completion of the highly polymerizing reaction. For example, a method in which, after dispersing and mixing by a high speed mixer represented by a tumbling mixer, a Henschel mixer, a ribbon blender or a super mixer, the mixture is melted and kneaded by an extruder, a Banbury mixer, a roller, etc., can be optionally selected.

After deactivating the catalyst, a step of devolatilizing and removing a low boiling point compound in the polymer under a pressure of 0.013 to 0.13 kPaA (0.1 to 1 torr), at a temperature of 200 to 350° C. may be provided. For the above procedure, a horizontal type apparatus equipped with a stirring blade excellent in surface renewal ability such as a paddle blade, lattice blade, and spectacle-shaped blade, or a thin film evaporator is suitably used.

Preferably, a twin-screw extruder or a horizontal type reactor having a polymer seal and having a vent structure is suitable.

Further, in the present invention, a heat resistant stabilizer, a hydrolysis stabilizer, an antioxidant, a pigment, a dye, a reinforcing agent or a filler, a UV absorber, a lubricant, a mold-releasing agent, a nucleating agent, a plasticizer, a fluidity improver, an antistatic agent, etc., may be added.

As the heat resistant stabilizer, there may be used those conventionally known such as triphenylphosphine (P-Ph$_3$).

Examples of the antioxidant may include tris-(2,4-di-t-butylphenyl)phosphite, n-octadecyl-β-(4'-hydroxy-3',5'-di-t-butylphenyl)propionate, pentaerythrityl-tetrakis[3-(3,5-di-t-butyl-4-hydroxyphenyl)propionate], n-octadecyl-β-(4'-hydroxy-3',5'-di-t-butylphenyl)propionate, 1,6-hexanediolbis[3-(3,5-di-t-butyl-4-hydroxyphenyl) propionate], triethylene glycol-bis-3-(3-t-butyl-4-hydroxy-5-methylphenylpropionate), 3,9-bis[2-{3-(3-t-butyl-4-hydroxy-5-methylphenyl)propionyloxy}-1,1-dimethylethyl]-2,4,8,10-tetraoxaspiro[5.5]undecane, triphenyl phosphite, trisnonylphenyl phosphite, tris-(2,4-di-t-butylphenyl)phosphite, tetrakis(2,4-di-t-butylphenyl)-4,4'-biphenylene diphosphonite, tricresyl phosphite, 2,2-methylenebis(4,6-di-t-butylphenyl)octyl phosphite, etc. Among these, preferred are tris-(2,4-di-t-butylphenyl)phosphite, and n-octadecyl-β-(4'-hydroxy-3',5'-di-t-butylphenyl)propionate.

These additives can be mixed with the polycarbonate resin in the same manner as the catalyst deactivator, by the conventionally known method. For example, a method in which each component is dispersed and mixed with a high speed mixer represented by a tumbling mixer, a Henschel mixer, a ribbon blender and a super mixer, and then, the mixture is melted and kneaded by an extruder, a Banbury mixer, a roller, etc., can be optionally selected. The additive (s) may be added simultaneously with the catalyst deactivator or separately from the same.

EXAMPLES

In the following, the present invention is explained by referring to Examples, but the present invention is not limited to these Examples. Incidentally, the measured values in Examples were measured by the following method or by using the following apparatus.

1) Weight average molecular weight (Mw) in terms of polystyrene standard: By using GPC, and chloroform as an eluent, a calibration curve was prepared by using standard polystyrenes (produced by TOSOH CORPORATION, "PStQuick MP-M") having a known molecular weights (molecular weight distribution=1). From the measured standard polystyrenes, elution times of each peak and molecular weight values were plotted, and approximation by a tertiary method was carried out to prepare a calibration curve. The weight average molecular weight (Mw) and the number average molecular weight (Mn) were obtained from the following calculation formulae.

$$Mw = \Sigma(W_i \times M_i) \div \Sigma(W_i)$$

$$Mn = \Sigma(N_i \times M_i) \div \Sigma(N_i)$$ [Calculation formula]

Here, i represents an $i^{th}$ separation point when the molecular weight M is divided, $W_i$ represents a weight at the $i^{th}$, $N_i$ represents a molecule number at the $i^{th}$, and $M_i$ represents a molecular weight at the $i^{th}$. Also, the molecular weight M represents a polystyrene molecular weight value at the same elution time of the calibration curve.

[Measurement Conditions]
Apparatus; produced by TOSOH CORPORATION, HLC-8320GPC
Column; Guard column: TSK guard column SuperMPHZ-M×1
Analysis column: TSKgel SuperMultipore HZ-M×3
Solvent; HPLC grade chloroform
Injected amount; 10 μL
Sample concentration; 0.2 w/v % HPLC grade chloroform solution
Solvent flow rate; 0.35 ml/min
Measurement temperature; 40° C.
Detector; RI 2) Measurement of Ratio of Heterologous Structure (Structural Units (1) to (3)):
The aromatic polycarbonate resin composition was subjected to alkali hydrolysis to a monomer level, and then, a contained ratio of the compounds (1) to (3) having the following structures which correspond to Structural units (1) to (3) in the monomer was measured by LC-MS analysis and obtained. Specifically, 0.1 g of a sample was collected into an Erlenmeyer flask, dissolved in 10 ml of dichloromethane, then, 1.8 ml of 28% sodium methoxide methanol solution, 8 ml of methanol and 2.6 ml of water were added to the solution, and the resulting mixture was stirred for 1 hour. Further, 12 ml of 1N-hydrochloric acid was added to the mixture to make a pH acidic, the mixture was stirred for 10 minutes and then, allowed to stand. The dichloromethane layer was collected and made a constant volume of 10 ml. 2 ml was extracted from the dichloromethane solution, and evaporated to dryness under nitrogen stream. To the sample was added 2 ml of acetonitrile and the resulting mixture was analyzed by LC-MS.

[LC-MS Analysis Conditions]
LC: Waters Acquity UPLC
Column: Waters BEH C18 (2.1 mm×100 mm, 1.7 um)
Eluent: A; 0.1%-HCO₂H aq. B; MeCN
    B=25-100% (0-8 min), B=100% (8-10 min)
Flow rate: 0.5 ml/min
Temperature: 40° C.
Detection: UV 220 nm
MS: Waters, MALDI-Synapt HDMS
Scanned range, rate: 100-1500/0.3 sec
Ionization method: ESI(−)
Measurement mode: MS
Resolution: 8500 (Vmode)
Capillary voltage: 3 kV
Cone voltage: 30V
Trap collision Energy: 6V
Transfer collision Energy: 4V
Source temperature: 150° C.
Desolvation temperature: 500° C.
Injection amount: 1 μl
Internal standard (mass correction): Leucine Enkephalin (m/z 554.2615)
Internal standard flow rate: 0.1 ml/min

[Objective Compound of LC-MS Analysis]
Compound (1) Corresponding to Structural Unit (1):

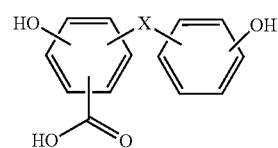

Compound (2) Corresponding to Structural Unit (2):

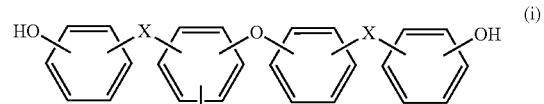

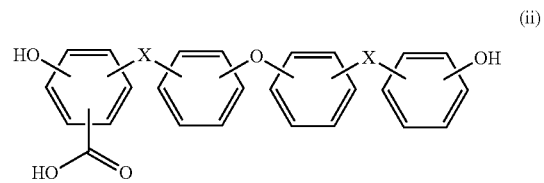

Compound (3) Corresponding to Structural Unit (3):

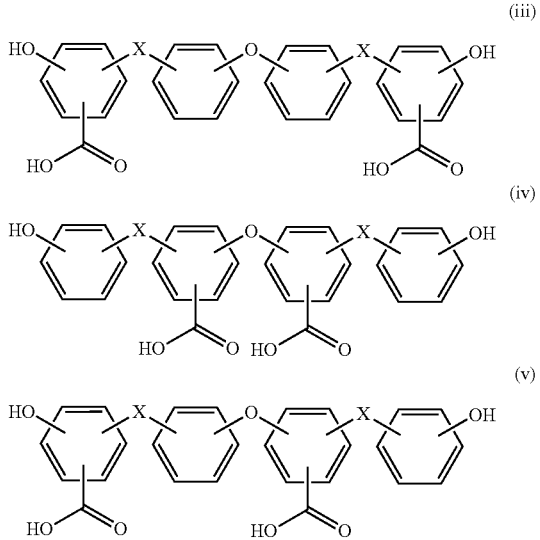

Incidentally, with regard to the standard sample of the heterologous structure component, the diphenolic acid having the structure represented by the following formula is used as a standard substance and determination was carried out. Accordingly, the obtained value is a corresponding value in terms of diphenolic acid. Specifically, 26.1 mg of diphenolic acid was diluted with 25 ml of acetonitrile to prepare a standard solution. This solution was diluted to prepare 1.0 to 250 mg/l of standard solutions.

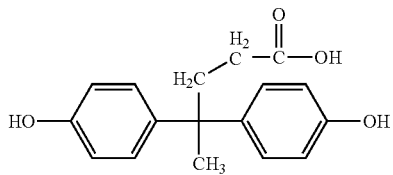 [SMILES: CC(CCC(=O)O)(c1ccc(O)cc1)c1ccc(O)cc1]

3) Terminal hydroxyl group concentration (ppm): A complex formed from the polymer and titanium tetrachloride in a methylene chloride solution was measured by UV/visible spectroscopy (546 nm). Or, it was measured by observing the terminal hydroxyl group from the analytical result of $^1$H-NMR.

A terminal hydroxyl group concentration in the prepolymer (PP) by $^1$H-NMR was obtained by dissolving 0.05 g of the resin sample in 1 ml of deuterium-substituted chloroform (containing 0.05 w/v % TMS), and measuring $^1$H-NMR at 23° C. Specifically, the terminal hydroxyl group concentration (OH concentration) in the PP was calculated from the integration ratio of the hydroxyl group peak at 4.7 ppm and the phenyl and phenylene groups (terminal phenyl group and phenylene group derived from BPA skeletal structure) at around 7.0 to 7.5 ppm.

Incidentally, details of the measurement conditions of $^1$H-NMR are as follows.
Apparatus: LA-500 (500 MHz) manufactured by JEOL Ltd.
Measured nucleus: $^1$H
Relaxation delay: 1 s
x_angle: 45 deg
x_90_width: 20 µs
x_plus: 10 µs
Scan: 500 times 4) Terminal phenyl group concentration (end-capped terminal group concentration, Ph terminal concentration; mol %): From the analytical results of the $^1$H-NMR, it was obtained by the following mentioned numerical formula.

$$\text{Ph terminal amount (mol \%)} = \frac{(\text{H areal ratio of terminal -Ph- }/2)}{(\text{H areal ratio of terminal -Ph- }/2 + \text{H areal ratio of -Ph- }/8)} \times 100$$

Specifically, 0.05 g of a resin sample was dissolved in 1 ml of deuterium-substituted chloroform (containing 0.05 w/v % TMS), $^1$H-NMR spectrum thereof was measured at 23° C., and a terminal phenyl group amount and terminal phenyl group concentration of the PP were measured from the integration ratio of the terminal phenyl group at around 7.4 ppm and the phenylene group (derived from BPA skeletal structure) at around 7.0 to 7.3 ppm.

Incidentally, details of the measurement conditions of $^1$H-NMR are as follows.
Apparatus: LA-500 (500 MHz) manufactured by JEOL Ltd.
Measured nucleus: $^1$H
Relaxation delay: 1 s
x_angle: 45 deg
x_90_width: 20 µs
x_plus: 10 µs
Scan: 500 times A whole terminal group amount of the polymer can be calculated from the above-mentioned terminal hydroxyl group concentration and the terminal phenyl group concentration.

5) Fluidity (Q value): Q value is an outflow (ml/sec) of the melt resin, and it was evaluated by using a constant-load orifice-type flow tester CFT-500D (manufactured by Shimadzu Corporation), after drying at 130° C. for 5 hours, from a melt flow volume per a unit time measured at 280° C. and a load of 160 kg.

6) N value: By using a constant-load orifice-type flow tester CFT-500D (manufactured by Shimadzu Corporation), with regard to an aromatic polycarbonate (sample) dried at 130° C. for 5 hours, a melt flow volume per a unit time measured at 280° C. and a load of 160 kg is made a Q160 value, and similarly a melt flow volume per a unit time measured at 280° C. and a load of 10 kg is made a Q10 value, and it was obtained from the following formula (1) by using the above.

$$N \text{ value} = (\log(Q160 \text{ value}) - \log(Q10 \text{ value}))/(\log 160 - \log 10) \quad (1)$$

7) Heat detention test of resin: 1 g of a sample resin was charged in a test tube, and dried in a glove box (oxygen concentration: 0.0%) replaced with nitrogen, with a block heater set at 120° C. for 2 hours. Subsequently, in the same glove box, the sample was detained under heating with a block heater set at 360° C. for 60 minutes. Changed amounts of the molecular weight (Mw) retaining ratio (%) and the YI value before and after the heat detention test were measured. Incidentally, this test is to provide a heat history at the maximum level of the general molding temperature of the polycarbonate, for example, for resin precision molding, etc., which is required to maintain the melt viscosity of the resin to a low level. A long detention time of 60 minutes is to set the conceivable longest detention time including a trouble of the apparatus, etc., in the actual molding site.

8) Resin hue (YI value) before and after heat detention test: 1 g of a resin sample was dissolved in 30 ml of methylene chloride, and a YI value was measured by using a spectroscopic color-difference meter (trade name: "SE-2000" manufactured by NIPPON DENSHOKU INDUSTRIES, Co., LTD.) with a cell having an optical path length of 20 mm.

9) Measurement method of cyclic carbonate content in the resin 10 g of a sample resin was dissolved in 100 ml of dichloromethane, and the solution was added dropwise into 1000 ml of methanol under stirring. The precipitates were removed by filtration, and the solvent in the filtrate was removed. The obtained solid was analyzed by GC-MS with the following measurement conditions. Incidentally, the detection limit value by the measurement conditions is 0.0005 ppm. GC-MS measurement conditions:

Measurement apparatus: Agilent HP6890/5973MSD
Column: capillary column DB-5MS, 30 m×0.25 mm I.D., film thickness: 0.5 μm
Temperature raising conditions: 50° C. (5 min hold)-300° C. (15 min hold), 10° C./min
Injection port temperature: 300° C., injected amount: 1.0 μl (split ratio: 25)
Ionation method: EI method
Carrier gas: He, 1.0 ml/min
Aux temperature: 300° C.
Mass scan range: 33-700
Solvent: chloroform for HPLC
Internal standard substance: 2,4,6-trimethylolphenol Incidentally, a chemical purity of the aliphatic diol compound used in the following Examples and Comparative example is each 98 to 99%, a chlorine content is 0.8 ppm or less, and contents of the alkali metal, alkaline earth metal, titanium and heavy metals (iron, nickel, chromium, zinc, copper, manganese, cobalt, molybdenum, tin) are each 1 ppm or less. Chemical purities of the aromatic dihydroxy compound and the carbonic acid diester are each 99% or higher, a chlorine content is 0.8 ppm or less, and contents of the alkali metal, alkaline earth metal, titanium and heavy metals (iron, nickel, chromium, zinc, copper, manganese, cobalt, molybdenum, tin) are each 1 ppm or less.

In the following Examples, 2,2-bis(4-hydroxyphenyl)propane is sometimes abbreviated to as "BPA", diphenylcarbonate as "DPC", prepolymer as "PP", a hydroxyl group as "OH group" and a phenyl group as "Ph".

Example 1

In 50 L of a reactor made of SUS equipped with a stirrer and a distillation device were charged 10001.0 g (43.808 mol) of 2,2-bis(4-hydroxyphenyl)propane, 10557.0 g (49.281 mol) of diphenylcarbonate and 1.0 μmol/mol-BPA of sodium hydrogen carbonate as a catalyst (the catalyst was calculated as a molar number to the 2,2-bis(4-hydroxyphenyl)propane), and an inside of the system was replaced by a nitrogen atmosphere. The pressure reduction degree was adjusted to 27 kPaA (200 torr), a heating medium was set at 205° C. and the starting materials were melted under heating, and then stirred.

Thereafter, a temperature of the heating medium was gradually raised, while simultaneously lowering the pressure reduction degree, and phenol distilled from the reaction system was condensed by a cooling tube and removed to carry out transesterification. Over about 4 hours, the reaction system was finally made a temperature of 260° C. and a pressure reduction degree of 0.13 kPaA (1 torr) or lower, and the state was maintained for further 1 hour. At this time, the weight average molecular weight (Mw) of the polycarbonate prepolymer a part of which was sampled was 22000, the terminal hydroxyl group concentration was 60 ppm, and the phenyl terminal concentration (Ph terminal concentration) was 5.0 mol %. Here, the terminal hydroxyl group concentration is a value calculated from NMR, and shows a terminal hydroxyl group concentration contained in the whole polymer. Also, the Ph terminal concentration is a value calculated from NMR, and shows a phenyl group (including a phenyl group substituted by a hydroxyl group) terminal concentration in the whole phenylene group and phenyl terminal.

Inside of the system was made the state at 280° C. and normal pressure, 209.53 g (1.308 mol) of 2-butyl-2-ethyl-propane-1,3-diol as the aliphatic diol compound was added to the reaction system, and the mixture was stirred for 3 minutes. Subsequently, the pressure reduction degree was maintained to 0.13 kPaA (1 torr) or lower, and stirring was continued for 90 minutes. The obtained polycarbonate resin had the weight average molecular weight (Mw)=62,000, the N value=1.23, the terminal hydroxyl group concentration=530 ppm and the YI value=1.0, and contained the heterologous structure formula (1)=280 ppm, the heterologous structure formula (2)=250 ppm, the heterologous structure formula (3)=30 ppm and the cyclic carbonate (5-butyl-5-ethyl-1,3-dioxan-2-one)=24 ppm.

1 g of this resin was charged in a test tube, and in a glove box (oxygen concentration: 0.0%) substituted with nitrogen, dried by a block heater set at 120° C. for 2 hours. Subsequently, in the same glove box, the sample was detained under heating with a block heater set at 360° C. for 60 minutes. As a result, the molecular weight (Mw) retaining ratio (%) before and after the detention test was 94%, and the changed amount of the YI value was +5.0.

Example 2

In 50 L of a reactor made of SUS equipped with a stirrer and a distillation device were charged 10,000.6 g (43.807 mol) of 2,2-bis(4-hydroxyphenyl)propane, 10,560.0 g (49.295 mol) of diphenylcarbonate and 0.5 μmol/mol-BPA of cesium carbonate as a catalyst (the catalyst was calculated as a molar number to the 2,2-bis(4-hydroxyphenyl)propane), and an inside of the system was replaced by a nitrogen atmosphere. The pressure reduction degree was adjusted to 27 kPaA (200 torr), a heating medium was set at 205° C. and the starting materials were melted under heating, and then stirred.

Thereafter, a temperature of the heating medium was gradually raised, while simultaneously lowering the pressure reduction degree, and phenol distilled from the reaction system was condensed by a cooling tube and removed to carry out transesterification. Over about 4 hours, the reaction system was finally made a temperature of 260° C. and a pressure reduction degree of 0.13 kPaA (1 torr) or lower, and the state was maintained for further 1 hour. The weight average molecular weight (Mw) of the obtained polycarbonate prepolymer was 22,000, the terminal hydroxyl group concentration was 60 ppm, and the phenyl terminal concentration (Ph terminal concentration) was 5.0 mol %. Here, the terminal hydroxyl group concentration is a value calculated from NMR, and shows a terminal hydroxyl group concentration contained in the whole polymer. Also, the Ph terminal concentration is a value calculated from NMR, and shows a phenyl group (including a phenyl group substituted by a hydroxyl group) terminal concentration in the whole phenylene group and phenyl terminal.

30.141 g of the above-mentioned polycarbonate prepolymer was charged in a 300 cc of a four necked flask equipped with a stirrer and a distillation device, and melted at 280° C. 0.376 g (0.00234 mol) of 2-butyl-2-ethyl-propane-1,3-diol as an aliphatic diol compound was added to the molten material at a jacket temperature of 280° C. and a normal pressure, and the mixture was stirred and kneaded for 15 minutes. Subsequently, at 280° C., the pressure was adjusted to 0.04 kPaA (0.3 torr) and the mixture was stirred and kneaded for 40 minutes to carry out transesterification.

The obtained polycarbonate resin had the weight average molecular weight (Mw)=56,000, the N value=1.20, the terminal hydroxyl group concentration=340 ppm and the YI value=0.6, and contained the heterologous structure formula (1)=100 ppm, the heterologous structure formula (2)=12 ppm, the heterologous structure formula (3)=40 ppm and the cyclic carbonate (5-butyl-5-ethyl-1,3-dioxan-2-one)=160 ppm.

1 g of this resin was charged in a test tube, and in a glove box (oxygen concentration: 0.0%) substituted with nitrogen, dried by a block heater set at 120° C. for 2 hours. Subsequently, in the same glove box, the sample was detained under heating with a block heater set at 360° C. for 60 minutes. As a result, the molecular weight (Mw) retaining ratio (%) before and after the detention test was 98%, and the changed amount of the YI value was +8.4.

Example 3

The same procedure as in Example 2 was carried out except for adding 0.257 g (0.00218 mol) of 2-ethyl-2-methyl-propane-1,3-diol as the aliphatic diol compound to the reaction system. The obtained polycarbonate resin had the weight average molecular weight (Mw)=48,000, the N value=1.23, the terminal hydroxyl group concentration=200 ppm, and the YI value=1.1, and contained the heterologous structure formula (1)=100 ppm, the heterologous structure formula (2)=20 ppm, the heterologous structure formula (3)=60 ppm, and the cyclic carbonate (5-ethyl-5-methyl-1,3-dioxan-2-one)=30 ppm.

1 g of this resin was charged in a test tube, and in a glove box (oxygen concentration: 0.0%) substituted with nitrogen, dried by a block heater set at 120° C. for 2 hours. Subsequently, in the same glove box, the sample was detained under heating with a block heater set at 360° C. for 60 minutes. As a result, the molecular weight (Mw) retaining ratio (%) before and after the detention test was 75%, and the changed amount of the YI value was +16.2.

Example 4

The same procedure as in Example 2 was carried out except for adding 0.288 g (0.00218 mol) of 2,2-diethyl-propane-1,3-diol as the aliphatic diol compound to the reaction system. The obtained polycarbonate resin had the weight average molecular weight (Mw)=47,000, the N value=1.19, the terminal hydroxyl group concentration=180 ppm, and the YI value=0.9, and contained the heterologous structure formula (1)=50 ppm, the heterologous structure formula (2)=20 ppm, the heterologous structure formula (3)=40 ppm, and the cyclic carbonate (5,5-diethyl-1,3-dioxan-2-one)=60 ppm.

1 g of this resin was charged in a test tube, and in a glove box (oxygen concentration: 0.0%) substituted with nitrogen, dried by a block heater set at 120° C. for 2 hours. Subsequently, in the same glove box, the sample was detained under heating with a block heater set at 360° C. for 60 minutes. As a result, the molecular weight (Mw) retaining ratio (%) before and after the detention test was 93%, and the changed amount of the YI value was +15.4.

Example 5

The same procedure as in Example 2 was carried out except for adding 0.410 g (0.00218 mol) of 2,2-diisobutyl-propane-1,3-diol as the aliphatic diol compound to the reaction system. The obtained polycarbonate resin had the weight average molecular weight (Mw)=42,000, the N value=1.21, the terminal hydroxyl group concentration=380 ppm, and the YI value=0.9, and contained the heterologous structure formula (1)=120 ppm, the heterologous structure formula (2)=20 ppm, the heterologous structure formula (3)=30 ppm, and the cyclic carbonate (5,5-diisobutyl-1,3-dioxan-2-one)=700 ppm.

1 g of this resin was charged in a test tube, and in a glove box (oxygen concentration: 0.0%) substituted with nitrogen, dried by a block heater set at 120° C. for 2 hours. Subsequently, in the same glove box, the sample was detained under heating with a block heater set at 360° C. for 60 minutes. As a result, the molecular weight (Mw) retaining ratio (%) before and after the detention test was 92%, and the changed amount of the YI value was +23.6.

Comparative Example 1

In 50 L of a reactor made of SUS equipped with a stirrer and a distillation device were charged 10,000.0 g (43.804 mol) of 2,2-bis(4-hydroxyphenyl)propane, 9,618.0 g (44.898 mol) of diphenylcarbonate and 0.5 μmol/mol-BPA of cesium carbonate as a catalyst (the catalyst was calculated as a molar number to the 2,2-bis(4-hydroxyphenyl)propane), and an inside of the system was replaced by a nitrogen atmosphere. The pressure reduction degree was adjusted to 27 kPaA (200 torr), a heating medium was set at 205° C. and the starting materials were melted under heating, and then stirred.

Thereafter, a temperature of the heating medium was gradually raised, while simultaneously lowering the pressure reduction degree, and phenol distilled from the reaction system was condensed by a cooling tube and removed to carry out transesterification. Over about 4 hours, the reaction system was finally made a temperature of 260° C. and a pressure reduction degree of 0.13 kPaA (1 torr) or lower, and the state was maintained for further 4 hours. A weight average molecular weight (Mw) of the obtained polycarbonate was 59,000, the terminal hydroxyl group concentration was 800 ppm, the N value=1.32 and the YI value=3.0, and contained the heterologous structure formula (1)=2100 ppm, the heterologous structure formula (2)=3100 ppm and the heterologous structure formula (3)=170 ppm.

The terminal hydroxyl group concentration is a value calculated from NMR, and shows a terminal hydroxyl group concentration contained in the whole polymer. Also, the Ph terminal concentration is a value calculated from NMR, and shows a phenyl group (including a phenyl group substituted by a hydroxyl group) terminal concentration in the whole phenylene group and phenyl terminal.

1 g of this resin was charged in a test tube, and in a glove box (oxygen concentration: 0.0%) substituted with nitrogen, dried by a block heater set at 120° C. for 2 hours. Subsequently, in the same glove box, when the sample was detained under heating with a block heater set at 360° C. for 60 minutes, then, it was gelated and became insoluble in a solvent (chloroform, dichloromethane). Therefore, the Mw and the YI value could not be measured.

TABLE 1

|  | Example 1 | Example 2 | Example 3 | Example 4 | Example 5 | Comparative example 1 |
|---|---|---|---|---|---|---|
| BPA (g) | 10,001.0 | 10,000.6 | 10,000.6 | 10,000.6 | 10,000.6 | 10,000.0 |
| BPA (mol) | 43.808 | 43.807 | 43.807 | 43.807 | 43.807 | 43.804 |
| DPC (g) | 10557.0 | 10560.0 | 10560.0 | 10560.0 | 10560.0 | 9618.0 |
| DPC (mol) | 49.281 | 49.295 | 49.295 | 49.295 | 49.295 | 44.898 |
| DPC/BPA molar ratio | 1.125 | 1.125 | 1.125 | 1.125 | 1.125 | 1.025 |
| Prepolymer molecular weight (Mw) | 22000 | 22000 | 22000 | 22000 | 22000 | — |
| Terminal hydroxyl group concentration (ppm) | 60 | 60 | 60 | 60 | 60 | — |
| Terminal phenyl group concentration (mol %) | 5.0 | 5.0 | 5.0 | 5.0 | 5.0 | — |
| Aliphatic diol compound | BEPD | BEPD | EMPD | *1 | *2 | — |
| Diol amount (g) | 209.53 | 0.376 | 0.257 | 0.288 | 0.410 | — |
| Diol amount (mol) | 1.308 | 0.00234 | 0.00218 | 0.00218 | 0.00218 | — |
| Mw | 62000 | 56000 | 48000 | 47000 | 42000 | 59000 |
| N value | 1.23 | 1.20 | 1.23 | 1.19 | 1.21 | 1.32 |
| Terminal hydroxyl group concentration (ppm) | 530 | 340 | 200 | 180 | 380 | 800 |
| Structural unit (1) content (ppm) | 280 | 100 | 100 | 50 | 120 | 2100 |
| Structural unit (2) content (ppm) | 250 | 12 | 20 | 20 | 20 | 3100 |
| Structural unit (3) content (ppm) | 30 | 40 | 60 | 40 | 30 | 170 |
| Cyclic carbonate content (ppm) | 24 | 160 | 30 | 60 | 700 | — |
| Molecular weight retained ratio (%) | 94 | 98 | 75 | 93 | 92 | — |
| YI value | 1.0 | 0.6 | 1.1 | 0.9 | 0.9 | 3.0 |
| YI value changed amount | +5.0 | +8.4 | +16.2 | +15.4 | +23.6 | — |

BEPD; 2-Buryl-2-ethyl-propane-1,3-diol,
EMPD; 2-Ethyl-2-methyl-propane-1,3-diol,
*1; 2,2-diethyl-propane-1,3-diol,
*2; 2,2-diisobutyl-propane-1,3-diol.

UTILIZABILITY IN INDUSTRY

The aromatic polycarbonate resin composition of the present invention mainly comprises an aromatic polycarbonate resin not only having good qualities that it has a high molecular weight, and a content of the specific heterologous structure is a certain value or less, but also it has the same structure as that obtained by the interfacial method and is excellent in heat resistance.

When such an aromatic polycarbonate resin composition is used as a substitute for the conventional general polycarbonate resin or composition, it has merits that a molding cycle becomes rapid, molding temperature can be set low, etc., and the aromatic polycarbonate resin composition can be preferably utilized for the uses such as various molded products, sheets, films, etc., obtained by various injection molding, blow molding, extrusion molding, injection blow molding, rotational molding, compression molding, etc.

Also, according to reduction of power consumption, etc., it can be expected to reduce a load to a natural environment and reduce a manufacturing cost of the molded product, so that it is economically excellent and the resin can be said to be gentle to the natural environment. In particular, even when a heat history at the maximum level of the general molding temperature of the polycarbonate is provided for a long period of time, it shows extremely excellent thermal stability that the molecular weight (Mw) retaining ratio is high (for example, 50% or more), and the changed amount of the YI value is small (for example, +25 or less), etc. Accordingly, the aromatic polycarbonate resin composition can be particularly preferably utilized for, for example, precision molding which requires to retain the melt viscosity of the resin at a low level.

The invention claimed is:

1. An aromatic polycarbonate resin composition which comprises a structural unit represented by the following formula (II), and at least one of structural units represented by the following formulae (1) and (2), wherein either of the structural units represented by the formulae (1) and (2) is contained in an amount of 2000 ppm or less in terms of a diphenolic acid, and a cyclic carbonate represented by the following formula (h3) is contained in an amount of 3000 ppm or less:

Formula (II)

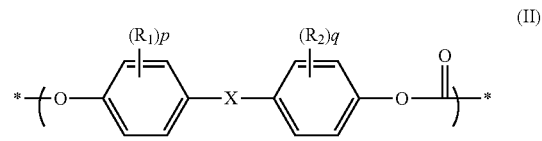

wherein $R_1$ and $R_2$ each independently represent a halogen atom, an alkyl group having 1 to 20 carbon atoms, an alkoxy group having 1 to 20 carbon atoms, a cycloalkyl group having 6 to 20 carbon atoms, an aryl group having 6 to 20 carbon atoms, a cycloalkoxy group having 6 to 20 carbon atoms or an aryloxy group having 6 to 20 carbon atoms, p and q each represent an integer of 0 to 4, X represents a single bond or a group selected from the group of the following (II');

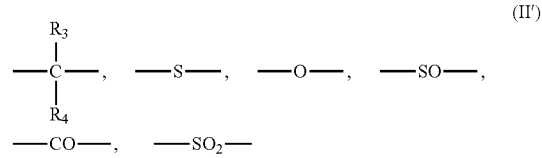

wherein $R_3$ and $R_4$ each independently represent a hydrogen atom, an alkyl group having 1 to 10 carbon atoms or an aryl group having 6 to 10 carbon atoms, or $R_3$ and $R_4$ may be bonded to each other to form an aliphatic ring;

Formula (1):

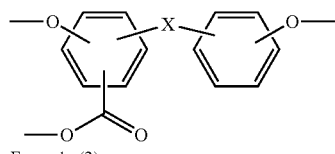

Formula (2):

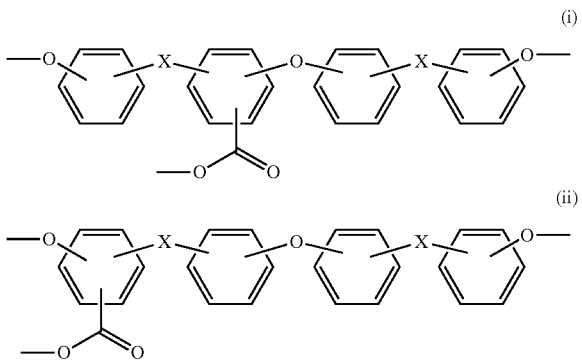

wherein X is the same as defined in the formula (II);

Formula (h3):

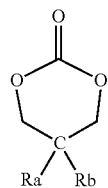

wherein Ra and Rb each independently represent a hydrogen atom, a halogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring.

2. The aromatic polycarbonate resin composition according to claim 1, wherein the structural unit represented by the formula (1) is contained in an amount of 2000 ppm or less in terms of a diphenolic acid.

3. The aromatic polycarbonate resin composition according to claim 1, wherein the structural units represented by the formulae (1) and (2) are each contained in an amount of 2000 ppm or less in terms of a diphenolic acid.

4. The aromatic polycarbonate resin composition according to claim 1, wherein the structural units represented by the formulae (1) and (2) are contained in total in an amount of 5000 ppm or less in terms of a diphenolic acid.

5. The aromatic polycarbonate resin composition according to claim 1, wherein a structural unit represented by the following formula (3) is further contained in an amount of 150 ppm or less in terms of a diphenolic acid:

Formula (3):

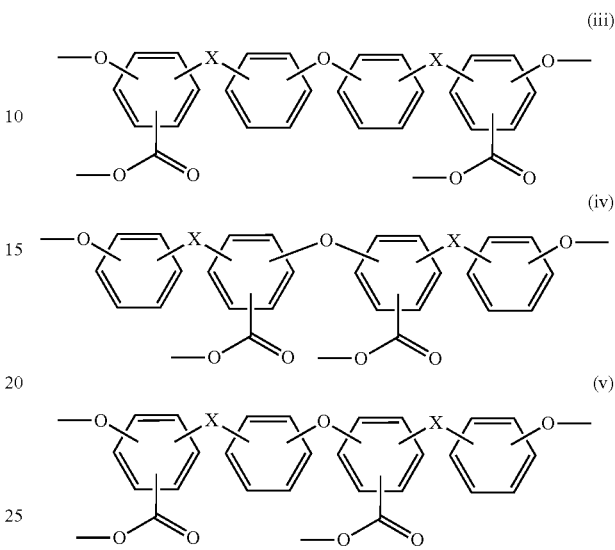

wherein X is the same as defined in the formula (II).

6. The aromatic polycarbonate resin composition according to claim 1, which has a weight average molecular weight (Mw) of 30,000 to 100,000.

7. The aromatic polycarbonate resin composition according to claim 1, wherein an N value (a structural viscosity index) represented by the following numerical formula (1) is 1.25 or less:

$$N \text{ value} = (\log(Q160 \text{ value}) - \log(Q10 \text{ value}))/(\log 160 - \log 10) \quad (1).$$

8. The aromatic polycarbonate resin composition according to claim 1, wherein a molecular weight (Mw) retention ratio after a heat detention test (at 360° C. for 60 minutes) is 50% or more.

9. A method for preparing the aromatic polycarbonate resin composition as set forth in claim 1, which comprises
a highly polymerizing step of reacting an aromatic polycarbonate prepolymer and an aliphatic diol compound represented by the following formula (g2) in the presence of a transesterification catalyst to obtain a highly polymerized aromatic polycarbonate resin, and
a cyclic carbonate-removing step of removing at least part of the cyclic carbonate by-produced in the highly polymerizing step out of the reaction system:

Formula (g2):

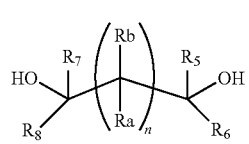

wherein Ra and Rb each independently represent a hydrogen atom, a halogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring, $R_5$ to $R_8$ each independently represent a hydrogen atom, a halogen atom or a linear or branched alkyl group having 1 to 5 carbon atoms; and n represents an integer of 0 to 30.

10. The preparation process according to claim 9, wherein the aliphatic diol compound represented by the formula (g2) is a compound represented by the following formula (g3):

Formula (g3):

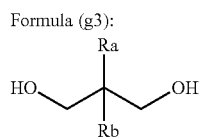

(g3)

wherein Ra and Rb each independently represent a hydrogen atom, a halogen atom, a linear or branched alkyl group having 1 to 30 carbon atoms which may contain an oxygen atom or a halogen atom, a cycloalkyl group having 3 to 30 carbon atoms which may contain an oxygen atom or a halogen atom, an aryl group having 6 to 30 carbon atoms which may contain an oxygen atom or a halogen atom, or an alkoxy group having 1 to 15 carbon atoms which may contain an oxygen atom or a halogen atom, or Ra and Rb may be bonded to each other to form a ring.

11. The preparation process according to claim 10, wherein the aliphatic diol compound is selected from the group consisting of 2-butyl-2-ethylpropane-1,3-diol, 2,2-diisobutylpropane-1,3-diol, 2-ethyl-2-methylpropane-1,3-diol, 2,2-diethylpropane-1,3-diol, and 2-methyl-2-propyl-propane-1,3-diol.

* * * * *